United States Patent
Suk et al.

(10) Patent No.: US 12,496,279 B2
(45) Date of Patent: Dec. 16, 2025

(54) NANOPARTICLES FOR DRUG DELIVERY TO BRAIN

(71) Applicant: The Johns Hopkins University, Baltimore, MD (US)

(72) Inventors: Jung Soo Suk, Baltimore, MD (US); Karina Negron, Baltimore, MD (US); Justin Hanes, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 789 days.

(21) Appl. No.: 17/602,664

(22) PCT Filed: Apr. 13, 2020

(86) PCT No.: PCT/US2020/027941
§ 371 (c)(1),
(2) Date: Oct. 8, 2021

(87) PCT Pub. No.: WO2020/210805
PCT Pub. Date: Oct. 15, 2020

(65) Prior Publication Data
US 2022/0175687 A1    Jun. 9, 2022

Related U.S. Application Data

(60) Provisional application No. 62/832,770, filed on Apr. 11, 2019.

(51) Int. Cl.
*A61K 9/51*    (2006.01)

(52) U.S. Cl.
CPC .......... *A61K 9/5146* (2013.01); *A61K 9/5123* (2013.01); *A61K 9/5153* (2013.01)

(58) Field of Classification Search
CPC .. A61K 9/5146; A61K 9/5123; A61K 9/5153; A61K 9/0012
See application file for complete search history.

(56) References Cited

U.S. PATENT DOCUMENTS

| | | |
|---|---|---|
| 2,003,014 A | 5/1935 | Siegrist |
| 4,027,676 A | 6/1977 | Mattei |
| (Continued) | | |

FOREIGN PATENT DOCUMENTS

| | | |
|---|---|---|
| CA | 2559208 | 9/2005 |
| CN | 101797232 | 8/2010 |
| (Continued) | | |

OTHER PUBLICATIONS

Li, Jingyan, "Surface-modified PLGA nanoparticles for targeted drug delivery to neurons" (2012). LSU Master's Theses. 4051. https://repository.lsu.edu/gradschool_theses/4051. (Year: 2012).*

(Continued)

*Primary Examiner* — Isaac Shomer
(74) *Attorney, Agent, or Firm* — Pabst Patent Group LLP

(57) ABSTRACT

Non-adhesive brain-permeable nanoparticles as large as 200 nm can diffuse rapidly in the brain ECS preferably made entirely of generally recognized as safe (GRAS) materials having neutral surface charge are described. Synergistic improvement of therapeutic distribution enabled by these non-adhesive, brain-permeable nanoparticles and osmosis-driven brain extracellular matrix (ECM) modulation will significantly enhance drug and gene delivery within the CNS, offering higher drug payload, improved drug loading efficiency, and significantly longer drug release durations.

15 Claims, 5 Drawing Sheets

(56) References Cited

U.S. PATENT DOCUMENTS

| | | | |
|---|---|---|---|
| 4,201,216 | A | 5/1980 | Mattei |
| 4,432,964 | A | 2/1984 | Shell |
| 4,757,128 | A | 7/1988 | Domb |
| 4,789,724 | A | 12/1988 | Domb |
| 4,816,567 | A | 3/1989 | Cabilly |
| 4,857,311 | A | 8/1989 | Domb |
| 4,857,602 | A | 8/1989 | Casey |
| 4,888,176 | A | 12/1989 | Langer |
| 4,994,074 | A | 2/1991 | Bezwada |
| 4,997,652 | A | 3/1991 | Wong |
| 5,013,556 | A | 5/1991 | Woodle |
| 5,034,506 | A | 7/1991 | Summerton |
| 5,091,652 | A | 2/1992 | Mathies |
| 5,356,633 | A | 10/1994 | Woodle |
| 5,412,072 | A | 5/1995 | Sakurai |
| 5,445,934 | A | 8/1995 | Fodor |
| 5,522,842 | A | 6/1996 | Shalaby |
| 5,540,930 | A | 7/1996 | Guy |
| 5,552,160 | A | 9/1996 | Liversidge |
| 5,567,435 | A | 10/1996 | Hubbell |
| 5,576,311 | A | 11/1996 | Guy |
| 5,578,325 | A | 11/1996 | Domb |
| 5,624,821 | A | 4/1997 | Winter |
| 5,696,298 | A | 12/1997 | Emanuele |
| 5,710,135 | A | 1/1998 | Leenders |
| 5,869,130 | A | 2/1999 | Ferrier |
| 5,932,462 | A | 8/1999 | Harris |
| 6,007,845 | A | 12/1999 | Domb |
| 6,117,454 | A | 9/2000 | Kreuter |
| 6,194,551 | B1 | 2/2001 | Idusogie |
| 6,235,869 | B1 | 5/2001 | Roby |
| 6,270,806 | B1 | 8/2001 | Liversidge |
| 6,287,588 | B1 | 9/2001 | Shih |
| 6,413,539 | B1 | 7/2002 | Shalaby |
| 6,432,381 | B2 | 8/2002 | Liversidge |
| 6,495,164 | B1 | 12/2002 | Ramstack |
| 6,509,323 | B1 | 1/2003 | Davis |
| 6,531,128 | B1 | 3/2003 | Wax |
| 6,589,549 | B2 | 7/2003 | Shih |
| 6,706,289 | B2 | 3/2004 | Lewis |
| 7,550,154 | B2 | 6/2009 | Saltzman |
| 7,638,137 | B2 | 12/2009 | Chauhan |
| 7,645,736 | B2 | 1/2010 | Bender |
| 7,648,959 | B2 | 1/2010 | Bender |
| 8,071,795 | B2 | 12/2011 | Vanmeir |
| 8,304,253 | B2 | 11/2012 | Yi |
| 8,354,476 | B2 | 1/2013 | Hanes |
| 8,394,799 | B2 | 3/2013 | Lee |
| 8,409,607 | B2 | 4/2013 | Hughes |
| 8,459,295 | B2 | 6/2013 | Kim |
| 8,465,778 | B2 | 6/2013 | Hughes |
| 8,481,069 | B2 | 7/2013 | Hughes |
| 8,512,738 | B2 | 8/2013 | Edelman |
| 8,628,801 | B2 | 1/2014 | Garreta |
| 8,632,809 | B2 | 1/2014 | Asgharian |
| 8,663,674 | B2 | 3/2014 | Wen |
| 8,834,695 | B2 | 9/2014 | Wang |
| 8,883,014 | B2 | 11/2014 | Nelson |
| 8,889,193 | B2 | 11/2014 | Mcdonnell |
| 8,891,193 | B1 | 11/2014 | Kermiche |
| 8,911,768 | B2 | 12/2014 | Whitcup |
| 8,957,034 | B2 | 2/2015 | Hanes |
| 8,962,577 | B2 | 2/2015 | Hanes |
| 9,005,544 | B2 | 4/2015 | Van Dam |
| 9,056,057 | B2 | 6/2015 | Popov |
| 9,169,573 | B2 | 10/2015 | Hadwen |
| 9,266,076 | B2 | 2/2016 | Kim |
| 9,327,037 | B2 | 5/2016 | Suk |
| 9,415,020 | B2 | 8/2016 | Ensign |
| 9,539,573 | B1 | 1/2017 | Hadwen |
| 9,566,242 | B2 | 2/2017 | Mcdonnell |
| 9,629,813 | B2 | 4/2017 | Ensign |
| 9,675,711 | B2 | 6/2017 | Suk |
| 9,808,800 | B2 | 11/2017 | Chen |
| 9,889,208 | B2 | 2/2018 | Hanes |
| 9,937,130 | B2 | 4/2018 | Mcdonnell |
| 10,335,500 | B2* | 7/2019 | Hanes ............... C12N 15/88 |
| 10,369,107 | B2 | 8/2019 | Mcdonnell |
| 10,668,025 | B2 | 6/2020 | Hanes |
| 11,033,637 | B2* | 6/2021 | Woodworth ....... A61K 47/6933 |
| 2002/0035264 | A1 | 3/2002 | Kararli |
| 2003/0013880 | A1 | 1/2003 | Murthy |
| 2003/0042137 | A1 | 3/2003 | Mao |
| 2003/0068277 | A1 | 4/2003 | Vanbever |
| 2003/0118550 | A1 | 6/2003 | Kabanov |
| 2003/0180366 | A1 | 9/2003 | Kirschner |
| 2003/0185892 | A1 | 10/2003 | Bell |
| 2003/0203038 | A1 | 10/2003 | Vail |
| 2004/0162580 | A1 | 8/2004 | Hain |
| 2004/0209806 | A1 | 10/2004 | Rothenberg |
| 2004/0209807 | A1 | 10/2004 | Quay |
| 2004/0234611 | A1 | 11/2004 | Ahlheim |
| 2004/0241248 | A1 | 12/2004 | Margalit |
| 2004/0258763 | A1 | 12/2004 | Bell |
| 2005/0009910 | A1 | 1/2005 | Hughes |
| 2005/0059881 | A1 | 3/2005 | Balaban |
| 2005/0070448 | A1 | 3/2005 | Kupper |
| 2005/0149118 | A1 | 7/2005 | Koyfman |
| 2005/0149119 | A1 | 7/2005 | Koyfman |
| 2005/0176945 | A1 | 8/2005 | Mount, Jr. |
| 2005/0244503 | A1 | 11/2005 | Rabinow |
| 2006/0276473 | A1 | 12/2006 | Bostion |
| 2007/0053845 | A1 | 3/2007 | Sengupta |
| 2007/0071756 | A1 | 3/2007 | Peyman |
| 2007/0087989 | A1 | 4/2007 | Huang |
| 2007/0093461 | A1 | 4/2007 | Shafiee |
| 2007/0111959 | A1 | 5/2007 | Yockman |
| 2007/0117102 | A1 | 5/2007 | Buzby |
| 2007/0141143 | A1 | 6/2007 | Smithey |
| 2007/0149593 | A1 | 6/2007 | Ghosh |
| 2007/0219122 | A1 | 9/2007 | Glazer |
| 2007/0231360 | A1 | 10/2007 | Peyman |
| 2007/0238654 | A1 | 10/2007 | Deschatelets |
| 2007/0249536 | A1 | 10/2007 | Ma |
| 2007/0292475 | A1 | 12/2007 | Campbell |
| 2008/0070920 | A1 | 3/2008 | Guo |
| 2008/0086199 | A1 | 4/2008 | Dave |
| 2008/0166411 | A1 | 7/2008 | Shah |
| 2008/0166414 | A1 | 7/2008 | Hanes |
| 2008/0213352 | A1 | 9/2008 | Lenk |
| 2008/0268243 | A1 | 10/2008 | Stopek |
| 2008/0287341 | A1 | 11/2008 | Chen |
| 2008/0287990 | A1 | 11/2008 | Smit |
| 2008/0305172 | A1 | 12/2008 | Ahlheim |
| 2009/0011040 | A1 | 1/2009 | Naash |
| 2009/0060979 | A1 | 3/2009 | Bezwada |
| 2009/0087494 | A1 | 4/2009 | Kompella |
| 2009/0130022 | A1 | 5/2009 | Nishigaki |
| 2009/0138041 | A1 | 5/2009 | Stopek |
| 2009/0148527 | A1 | 6/2009 | Robinson |
| 2009/0162358 | A1 | 6/2009 | Alard |
| 2009/0169611 | A1 | 7/2009 | Albrecht |
| 2009/0186771 | A1 | 7/2009 | Siddiqi |
| 2009/0203709 | A1 | 8/2009 | Steinberg |
| 2009/0220572 | A1 | 9/2009 | Deschatelets |
| 2009/0226531 | A1 | 9/2009 | Lyons |
| 2009/0234375 | A1 | 9/2009 | Simon |
| 2009/0247604 | A1 | 10/2009 | Tang |
| 2009/0291919 | A1 | 11/2009 | Kaushal |
| 2010/0015051 | A1 | 1/2010 | Labhasetwar |
| 2010/0015231 | A1 | 1/2010 | Lu |
| 2010/0034749 | A1 | 2/2010 | Schulze |
| 2010/0063135 | A1 | 3/2010 | Dande |
| 2010/0068285 | A1 | 3/2010 | Zale |
| 2010/0094340 | A1 | 4/2010 | Stopek |
| 2010/0152831 | A1 | 6/2010 | Guo |
| 2010/0160252 | A1 | 6/2010 | Chetoni |
| 2010/0166865 | A1 | 7/2010 | Kumar |
| 2010/0172967 | A1 | 7/2010 | Nemoto |
| 2010/0196492 | A1 | 8/2010 | Green |
| 2010/0209469 | A1 | 8/2010 | Bezwada |
| 2010/0215580 | A1 | 8/2010 | Hanes |
| 2010/0227905 | A1 | 9/2010 | Kabra |
| 2011/0081647 | A1 | 4/2011 | Siddiqi |

(56) References Cited

U.S. PATENT DOCUMENTS

| | | |
|---|---|---|
| 2011/0163080 A1 | 7/2011 | Beck |
| 2011/0165074 A1 | 7/2011 | Gruell |
| 2011/0206773 A1 | 8/2011 | Lavik |
| 2011/0262406 A1 | 10/2011 | Campo |
| 2011/0264139 A1 | 10/2011 | Hunter |
| 2011/0293730 A1* | 12/2011 | Kreuter .............. A61K 9/5153 977/773 |
| 2012/0028910 A1 | 2/2012 | Combal |
| 2012/0041481 A1 | 2/2012 | Daniloff |
| 2012/0052041 A1 | 3/2012 | Basu |
| 2012/0083037 A1 | 4/2012 | Wendorff |
| 2012/0121661 A1 | 5/2012 | Schwartz |
| 2012/0121718 A1 | 5/2012 | Lai |
| 2012/0149630 A1 | 6/2012 | Zugates |
| 2012/0157499 A1 | 6/2012 | Hughes |
| 2012/0201873 A1 | 8/2012 | Hohlbaum |
| 2012/0225129 A1 | 9/2012 | Eliasof |
| 2012/0245629 A1 | 9/2012 | Gross |
| 2012/0269894 A1 | 10/2012 | Ahlheim |
| 2012/0288464 A1 | 11/2012 | Carmichael |
| 2012/0303010 A1 | 11/2012 | Vijfvinkel |
| 2013/0041407 A1 | 2/2013 | Montenegro |
| 2013/0071349 A1 | 3/2013 | Robinson |
| 2013/0101672 A1 | 4/2013 | Cheng |
| 2013/0108551 A1 | 5/2013 | Langereis |
| 2013/0122064 A1 | 5/2013 | Ahlheim |
| 2013/0164343 A1 | 6/2013 | Hanes |
| 2013/0183244 A1 | 7/2013 | Hanes |
| 2013/0189743 A1 | 7/2013 | Balasubramanian |
| 2013/0217657 A1 | 8/2013 | Lindstrom |
| 2013/0226234 A1 | 8/2013 | Avelar |
| 2013/0236556 A1 | 9/2013 | Lai |
| 2013/0256868 A1 | 10/2013 | Aliyev |
| 2013/0272994 A1 | 10/2013 | Fu |
| 2013/0274217 A1 | 10/2013 | Hanes |
| 2013/0316001 A1 | 11/2013 | Popov |
| 2013/0316006 A1 | 11/2013 | Popov |
| 2013/0316009 A1 | 11/2013 | Popov |
| 2013/0323313 A1 | 12/2013 | Suk |
| 2014/0031408 A1 | 1/2014 | Edelman |
| 2014/0107025 A1 | 4/2014 | Wirostko |
| 2014/0163080 A1 | 6/2014 | Horn |
| 2014/0178475 A1 | 6/2014 | Figueiredo |
| 2014/0212661 A1 | 7/2014 | Khan |
| 2014/0248358 A1 | 9/2014 | Figueiredo |
| 2014/0249158 A1 | 9/2014 | Figueiredo |
| 2014/0276482 A1 | 9/2014 | Astafieva |
| 2014/0294986 A1 | 10/2014 | Liu |
| 2014/0329913 A1 | 11/2014 | Hanes |
| 2015/0044270 A1 | 2/2015 | Mcdonnell |
| 2015/0086484 A1 | 3/2015 | Hanes |
| 2015/0125539 A1 | 5/2015 | Popov |
| 2015/0265542 A1 | 9/2015 | Popov |
| 2015/0265543 A1 | 9/2015 | Popov |
| 2015/0297531 A1 | 10/2015 | Ensign |
| 2016/0000724 A1* | 1/2016 | Kulkarni .............. A61K 9/0019 435/375 |
| 2016/0235674 A1 | 8/2016 | Mcdonnell |
| 2016/0243257 A1 | 8/2016 | Suk |
| 2017/0157147 A1* | 6/2017 | Hanes .................. A61K 31/00 |
| 2018/0151472 A1 | 5/2018 | Chen |
| 2018/0193488 A1 | 7/2018 | Hanes |
| 2018/0271796 A1 | 9/2018 | Zhang |

FOREIGN PATENT DOCUMENTS

| | | |
|---|---|---|
| CN | 101926775 | 9/2011 |
| CN | 102379850 | 3/2012 |
| EP | 1356809 | 10/2003 |
| EP | 19855309 | 10/2008 |
| EP | 2070521 | 6/2009 |
| EP | 2156848 | 2/2010 |
| EP | 2161020 | 3/2010 |
| EP | 2351556 | 8/2011 |
| JP | 2007001926 | 1/2007 |
| JP | 2009096749 | 5/2009 |
| JP | 2015505855 | 2/2015 |
| WO | 9207866 | 5/1992 |
| WO | 9503357 | 2/1995 |
| WO | 9742962 | 11/1997 |
| WO | 9859064 | 12/1998 |
| WO | 98059064 | 12/1998 |
| WO | 9901498 | 1/1999 |
| WO | 9958572 | 11/1999 |
| WO | 0046147 | 8/2000 |
| WO | 0066180 | 11/2000 |
| WO | 0224232 | 3/2002 |
| WO | 2002038127 | 5/2002 |
| WO | 2006109177 | 5/2002 |
| WO | 02060412 | 8/2002 |
| WO | 2004002453 | 1/2004 |
| WO | 2004060977 | 7/2004 |
| WO | 2004084871 | 10/2004 |
| WO | 2004112695 | 12/2004 |
| WO | 2005012407 | 2/2005 |
| WO | 2005055985 | 6/2005 |
| WO | 2005072710 | 8/2005 |
| WO | 2005099717 | 10/2005 |
| WO | 2006005880 | 1/2006 |
| WO | 2006047788 | 5/2006 |
| WO | 2006063249 | 6/2006 |
| WO | 2006114739 | 11/2006 |
| WO | 2006116107 | 11/2006 |
| WO | 2006122542 | 11/2006 |
| WO | 2007016380 | 2/2007 |
| WO | 2007084418 | 7/2007 |
| WO | 2007133812 | 11/2007 |
| WO | 2008030557 | 3/2008 |
| WO | 200054544 | 5/2008 |
| WO | 2008054544 | 5/2008 |
| WO | 2008117927 | 10/2008 |
| WO | 2009121631 | 1/2009 |
| WO | 2009136763 | 11/2009 |
| WO | 2009151539 | 12/2009 |
| WO | 2010040188 | 4/2010 |
| WO | 2010042870 | 4/2010 |
| WO | 2010075072 | 7/2010 |
| WO | 2010086406 | 8/2010 |
| WO | 2010132664 | 11/2010 |
| WO | 2010143969 | 12/2010 |
| WO | 2011041373 | 4/2011 |
| WO | 2011080148 | 7/2011 |
| WO | 2012109363 | 8/2012 |
| WO | 2013038195 | 3/2013 |
| WO | 2013090804 | 6/2013 |
| WO | 2013102011 | 7/2013 |
| WO | 2013110028 | 7/2013 |
| WO | 2013129935 | 9/2013 |
| WO | 2013138343 | 9/2013 |
| WO | 2013138346 | 9/2013 |
| WO | 2013158719 | 10/2013 |
| WO | 2013166385 | 11/2013 |
| WO | 2013166408 | 11/2013 |
| WO | 2013166436 | 11/2013 |
| WO | 2013166498 | 11/2013 |
| WO | 2014047439 | 3/2014 |
| WO | 2014066811 | 5/2014 |
| WO | 2015175545 | 11/2015 |
| WO | 2016025215 | 2/2016 |
| WO | 2016111251 | 7/2016 |
| WO | 2016154622 | 9/2016 |
| WO | WO-2017044759 A1 * | 3/2017 .............. A61K 47/02 |
| WO | 2018140826 | 8/2018 |

OTHER PUBLICATIONS

Li, Jingyan, "Surface-modified PLGA nanoparticles for targeted drug delivery to neurons" (2012). LSU Master's Theses. 4051. https://frepository.lsu.edu/gradschool_theses/4051 (Year: 2012).*

ICI Americas Inc. "The HLB System A Time-Saving Guide to Emulsifier Selection." ICI Americas Inc., Wilmington, Delaware, Revised Mar. 1980, pp. 1-22. (Year: 1980).*

(56) References Cited

OTHER PUBLICATIONS

Alice Gaudin, Eric Song, Amanda R. King, Jennifer K. Saucier-Sawyer, Ranjit Bindra, Didier Desmaeele, Patrick Couvreur, W. Mark Saltzman. "PEGylated squalenoyl-gemcitabine nanoparticles for the treatment of glioblastoma." Biomaterials, vol. 105, 2016, pp. 136-144. (Year: 2016).*
United States Court of Appeals for the Federal Circuit. "*Purdue Pharma L.P.* v. *Endo Pharmaceuticals Inc*." 04-1189, -1347, -1357, decided Feb. 1, 2006, pp. 1-24 and two initial pages (Year: 2006).*
Westlaw. "Application of Cescon, 474 F.2d 1331 (1973) 474 F.2d 1331 United States Court of Customs and Patent Appeals." Obtained 2025, originally published Mar. 22, 1973, 5 printed pages. (Year: 1973).*
Karina Negron et al. "A Highly Translatable Dual-arm Local Delivery Strategy To Achieve Widespread Therapeutic Coverage in Healthy and Tumor-bearing Brain Tissues." vol. 19, 2023, 2207278, pp. 1-10. (Year: 2023).*
Mauro Almeida, Mariana Magalhães, Francisco Veiga, and Ana Figueiras. "Poloxamers, poloxamines and polymeric micelles: Definition, structure and therapeutic applications in cancer." Journal of Polymer Research, vol. 25:31, pp. 1-14, available online Dec. 30, 2017. (Year: 2017).*
Adrenal Cortical Hormone Preparation Decadron Injection Solution Sep. 2009. Japanese language document.—May have not gotten an English Translation.
Aich, et al., "Development of delivery methods for carbohydrate-based drugs; controlled release of biologically-active short chain fatty acid-hexosamine analogs", Glycoconj. J., 27 (4):445-59 (2010).
Al-Swailem, "Graft failure: II. Ocular surface complications", Int. Ophthalmol., 28:175-189 (2008).
Aldrich, et al., "Ophthalmic Preparations", 39(5):1-24 (2013).
Aleksandar, et al., "Bacteria-Targeting Nanoparticles for Managing Infections", Submitted To The Health Sciences And Technology Program In Partial Fulfillment Of The Requirements For The Degree Of Doctor Of Philosophy In Chemical And Biomedical Engineering At The Massachusetts Institute of Technology, (2013).
Allard, "Convection-enhanced delivery of nanocarriers for the treatment of brain tumors", Biomaterials, 30(12):2302-18 (2009).
Allen, et al. "Controlling the Physical Behavior and Biological Performance of Liposome Formulations through Use of Surface Grafted Poly(ethylene Glycol)" Bioscience Reports, 22(2):225-250 (2002).
Ambruosi, et al., "Influence of surfactants, polymer and doxorubicin loading on the anti-tumour effect of poly(butyl cyanoacrylate) nanoparticles in a rat glioma model", Journal of Microencapsulation, 23(5):582-592 (2006).
Amrite, et al., "Single periocular injection of celecoxib-PLGA microparticles inhibits diabetes-induced elevations in retinal PGE2, VEGF, and vascular leakage", Invest. Ophthalmol. Visual Sci., 47:1149-60 (2006).
Amrite, et al., "Size-dependent disposition of nanoparticles and microparticles following subconjunctival administration", J. Pharm. Pharmacol., 57:1555-63 (2005).
Angal, et al., "A single amino acid substitution abolishes the heterogeneity of chimeric mouse/human (IgG4) antibody", Mol. Immunol. 30:105-08 (1993).
Apgar, et al., "Multiple-particle tracking measurements of heterogeneities in solutions of actin filaments and actin bundles", Biophys. J., 79:1095-1106 (2000).
Arifin, "Remote MR sensing of pH and cell viability using LipoCEST-filled microcapsules", Proc. Intl. Soc. Mag. Reson. Med., 18:42 (2010a).
Arifin, et al., "Remote MRI sensing of pH and cell viability using immunoprotective microcapsules crosslinked with polycationic Diacest peptides", Intl. Soc. Magnetic Resonance in Med., 18:42, Stockholm Apr. 30-May 7, 2010b.
Arifin, et al., "Role of convective flow in carmustine delivery to a brain tumor" Pharm Res., 26(10):2289-302 (2009).
Asscher, et al., "Cornification of the human vaginal epithelium", J. Anat., 90(Pt 4 ):547-552 (1956).
Astete and Sabliov, "Synthesis and characterization of PLGA nanoparticles" , Biomater Sci Polymer Ed., 17:247-89 (2006).
Auguste, et al. "pH triggered release of protective poly(ethylene glycol)-b-polycation copolymers from liposomes", Biomaterials, 27(12)2599-2608 (2006).
Augustin, et al., "Treatment of neovascular age-related macular degeneration: Current therapies", Clin. Ophthalmol. , 3: 175-82 (2009).
Ayalasomayajula, et al., "Retinal delivery of celecoxib is severalfold higher following subconjunctival administration compared to systemic administration", Pharm. Res., 21 :1797-1804 (2004).
Ayalasomayajula, et al., "Subconjunctivally administered celecoxib-PLGA microparticles sustain retinal drug levels and alleviate diabetes-induced oxidative stress in a rat model", Eur. J. Pharmacol., 511 :191-8 (2005).
Bahar, et al., "Subconjunctival Bevacizumab Injection for Corneal Neovascularization", Cornea, 27(2): 142-147 (2008).
Barbu, et al., "The potential for nanoparticle-based drug delivery to the brain: overcoming the blood-brain barrier", Expert. Opin. Drug Deliv., 6:553-565 (2009).
Barnes, "Mechanisms and resistance in glucocorticoid control of inflammation", J. Steroid Biochem. Mol. Biol., 120:76-85 (2010).
Batrakova, et al., "Pluronic block copolymers: evolution of drug delivery concept from inert nanocarriers to biological response modifiers", Journal of Controlled Release., 130(2):98-106 (2008).
Ben-Shabat, et al., PEG-PLA block copolymer as potential drug carrier: preparation and characterization. Macromol. Biosci., 6:1019-1025 (2006).
Bertschinger, et al., "Disassembly of polyethylenimine-DNA articles in vitro: impliations for polyethylenimine-mediated DNA delivery", J.Controlled Release, 116:96-104 (2006).
Betbeder, et al. (Influence of surface charge and inner composition of porous nanoparticles to cross blood-brain barrier in vitro, Int. J. Pharm., 344: 103-109 (2007).
Beyerle, et al., "PEGylation affects cytotoxicity and cell-compatibility of poly(ethyleneimine) for lung application: structure-function relationships", Toxicol. Appl. Pharmacol. 242:1 46-54 (2010).
Blessing, et al., "Monomolecular collapse of plasmid DNA into stable virus-like Particles", PNAS, 95:1427-31 (1998).
Bobo, et al., "Convection-enhanced delivery of macromolecules in the brain", PNAS, 91(6):2076-80 (1994).
Bodker, et al., "Intraocular dexamethasone penetration via subconjunctival or retrobulbar injections in rabbits", Ophthalmic Surg., 24:453-7 (1993) Abstract Only.
Boskey, et al., "A self-sampling method to obtain large volumes of undiluted cervicovaginal secretions", Sex Transm. Dis., 30(2):107-109 (2003).
Bourges, et al, "Ocular drug delivery targeting the retina and retinal pigment epithelium using polyactide nanoparticles", Inv. Ophthalmology Vis. Sci., 44 (8):3562-9 (2003).
Boylan, et al., "Highly compacted DNA nanoparticles with low MW PEG coatings: in vitro, ex vivo and in vivo evaluation", J. Control. Release, 157(1):72-79 (2012).
Bramwell, et al. Biodegradable mucoadhesive particulates for nasal and pulmonary antigen and DNA delivery, Advanced Drug Delivery Reviews, 57:415-418 (2005).
Bundgaard, et al., "Effects of dihydroergotamine on intracranial pressure, cerebral blood flow and cerebral metabolism in patients undergoing craniotomy for brain tumor" , JNeurosurg Anesthesiol, 13(3}: 195-201 (2001 ).
Caliceti, et al., "Pharmacokinetic and biodistribution properties of poly(ethylene glycol)-protein conjugates", Adv. Drug Deliv. Rev., 55(10):1261-1277 (2003).
Cattaneo, et al., Intranasal delivery of therapeutic proteins for neurological diseases, Expert Opin. Drug Deliv., 8:1277-1296 (2011).
Cattel, et al., "From conventional to stealth liposomes a new frontier in cancer chemotherapy", Tumori, 83(3):237-49 (2003).
Champlin, et al., "Determining the stage of the estrous cycle in the mouse by the appearance of the vagina", Biol. Reprod., 8(4):491-494 (1973).

(56) References Cited

OTHER PUBLICATIONS

Chan, et al., "Development of CEST liposomes for monitoring nanoparticle-based cancer therapies", Proceeding Intl. Soc Magnetic Resonance Med., 21:0422 21'st meeting, Salt Lake City, Apr. 20-26, 2013.
Chen, et al., "Changes in brain cell shape create residual extracellular space volume and explain tortuosity behavior during osmotic challenge", Proc Natl Acad Sci U S A., 97(15):8306-8311 (2000).
Chennamanenl, et al., "Development of a novel bioerodible dexamethasone implant for uveitis and postoperative cataract inflammation", J Control Release, 167(1):53-9 (2013).
Cho, "Flt23k nanoparticles offer additive benefit in graft survival and anti-angiogenic effects when combined with triamcinolone", Invest. Ophthalmol. Visual Sci. , 53:2328-36 (2012).
Chong and Dana, "Graft failure IV. Immunologic mechanisms of corneal transplant rejection", Int. Ophthalmol., 28:209-22 (2008).
Clark and Friend, "Pharmacokinetics. and Topical Vaginal Effects of Two Tenofovir Gels in Rabbits" , AiDS ResHur.I!, Retroviruses, 28(11):1458-66 (2012).
Cone, "Barrier properties of mucus", Adv. Drug Deliv. Rev., 61:75-78 (2009).
Cone, "Mucus", Mucosal Immunology, 3rd Edition, 49-72 (2005).
Cragg, "Preservation of extracellular space during fixation of the brain for electron microscopy", Tissue Cell, 12(1 ):63-72 (1980).
Cu, et al., "Controlled surface modification with poly(ethylene)glycol enhances diffusion of PLGA nanoparticles in human cervical mucus", Mol. Pharma., 6(1):173-81 (2009).
Cu, et al., "In vivo distribution of surface-modified PLGA nanoparticles following intravaginal delivery", Journal of Controlled Release, 156(2):258-264 (2011).
Da Silva, et al., "DNA nanoparticie-mediated thymulin gene therapy prevents airway remodeling in experimental allergic asthma", J. Control. Release, 180:125-133 (2014).
Dana, et al., "Twenty-five-year panorama of corneal immunology—Emerging concepts in the immunopathogenesis of microbial keratitis, peripheral ulcerative keratitis, and corneal transplant rejection", Cornea, 19:625-43 (2000).
Danhier, et al., "PLGA-based nanoparticles: an overview of biomedical applications", Journal of Controlled Release., 161(2):505-522 (2012).
Das Neves and Bahia, "Gels as vaginal drug delivery systems" , Int. J. Pharm., 318(1-2):1-14 (2006).
Dauty, et al., "Dimerizable cationic detergents with a low cmc condense plasmid DNA into nanometric particles and transfect cells in culture", J. Am. Chem. Soc. 123:9227-34 (2001).
Dawson, et al., "Enhanced viscoelasticity of human cystic fibrotic sputum correlates with increasing microheterogeneity in particle transport" , J Bioi Chem., 278(50):50393-401 (2003).
Dawson, et al., "Transport of polymeric nanoparticie gene carriers in gastric mucus", Biotechnol. Prog., 20 (3):851-857 (2004).
De Kozak, et al., "Intraocular injection of tamoxifen-loaded nanoparticles: a new treatment of experimental autoimmune uveoeretinitis" , Eur. J Immunol., 34:3702-12 (2004).
Deascentiis, et al., "Mucoadhesion of poly(2-hydroxyethyl methacrylate) is improved when linear ply(ethylene oxide) chains are added to the polymer network", J. Control. Release, 33(1 ):197-201 (1995).
Deosarkar, et al., "Polymeric particles conjugated with a ligand to VCAM-1 Exhibit selective, avid, and focal adhesion to sites of atherosclerosis" , Biotech. Bioeng., 101(2):400-7 (2008).
Desai, "Pluronic F127-based ocular delivery system containing biodegradable polyisobutylcyanoacrylate nanocapsules of pilocarpine", Drug Delivery, 7:201-7 (2000).
Di Tommaso, et al., "Novel micelle carriers for cyclosporin A topical ocular delivery: In vivo cornea penetration, ocular distribution and efficacy studies", Eur. J. Pharm. Biopharm., 81:257-264 (2012).
Diebold, et al., "Drug delivery systems for ophthalmic administration of anti-inflammatory agents", Anti-Inflammatory & Anti-Allergy Agents in Medicinal Chemistry, 10(3):203-14 (2011) Abstract Only.

Dong, et al., "Vascular cell-adhesion molecule-1 plays a central role in he proangiogenic effects of oxidative stress", PNAS, 108(35):14614-9 (2011).
Dreborg, et al., "Immunotherapy with monomethoxypolyethylene glycol modified allergens", Crit. Rev. Ther. Drug Carrier Syst., 6(4 ):315-365 (1990).
Du, et al., "Grafted poly-(ethylene glycol) on lipid surfaces inhibits protein adsorption and cell adhesion", Biochim. Biophys. Acta., 1326(2):236-248 (1997).
Dunmire and Katz, "Alteration of human sperm kinematics in cervical mucus due to nonoxynol~9", Contraception, 55:209-17 (1997).
Edelhauser, et al., "Ophthalmic Drug Delivery Systems for the Treatment of Retinal Diseases: Basic Research to Clinical Applications", Invest. Ophthalmol. Visual Sci., 51 :5403-20 (2010).
Edwards, et al., Effect of Polyethyleneglycol-Phospholipids on Aggregate Structure in Preparations of Small Unilamellar Liposomes, Biophysical Journal , 73:258-266 (1997).
Ensign, et al., "Enhanced vaginal drug delivery through the use of hypotonic formulations that induce fluid uptake", Biomaterials, 34(28):6922-6929 (2013a).
Ensign, et al., "Ex vivo characterization of particle tranport in mucus secretions coating freshly excised mucosal tissues", Mol. Pharm., 10(6):2176-2182 (2013b).
Ensign, et al., "Mucus-penetrating nanoparticles for vaginal drug delivery against herpes simplex virus", Sci. Transl. Med., 4(138 ):138ra79 (2012a).
Ensign, et al., "Oral drug delivery with polymeric nanoparticles: The gastrointestinal mucus barriers", Advanced Drug Delivery Reviews, 64:557-570 (2012b).
Ensign, et al., "Mucus Penetrating Nanoparticles: Biophysical Tool and Method of Drug and Gene Delivery", Adv. Mater. 24(28):3887-94 (2012c).
Erdmann and Uhrich, "Synthesis and degradation characteristics of salicylic acid-derived poly (anhydride-esters)", Biomaterials, 21:1941-6 (2000).
Escobar-Chavez, "Application of thermo-reversible pluronic F-127 gels in pharmaceutical formulations", J. Pharma Sel., 9(3):339-58 (2006).
Evbuomwan, et al., "Nanoparticle-based PARACEST agents: the quenching effect of silica nanoparticles on the CEST signal from surface-conjugated chelates", Contrast Media Mol Imaging, 7(1):19-25 (2012).
Eyles, et al., "The Transfer of Polystyrene Microspheres from the Gastrointestinal Tract to the Circulation after Oral Administration in the Rat", Journal of Pharmacy and Pharmacology, 47:561-565 (1995).
Fahmy, et al., "Surface modification of biodegradable polyesters with fatty acid conjugates for improved drug targeting", Biomaterials, 26:5727-5736 (2005).
Ferrari, at al., "Barriers to and new approaches for gene therapy and gene delivery in cystic fibrosis", Adv. Drug Deliv. Rev., 54:1373-93 (2002).
Ferrari, et al., "Immunological hurdles to lung gene therapy" , Clin. Exp. Immunol., 132:1-8 (2003).
Ferrari, et al., "Polyethylenimine shows properties of interest for cystic fibrosis gene therapy", Biochemica Et Biophysica Acta, Gene Structure And Expression, 1447(2-3): 219-225 (1999).
Fiegel, et al., "Poly(ether-anhydride) dry powder aerosols for sustained drug delivery in the lungs", J. Control. Release, 96:411-23 (2004).
Fields, et al., "Surface modified poly ($\beta$ amino ester)-containing nanoparticles for plasmid DNA delivery", Journal Of Controlled Release, 164(1): 41-48 (2012).
Fischer, et at, "A novel non-viral vector for DNA delivery based on low molecular weight branched polyethylenimine: effect of molecular weight on transfection efficiency and cytotoxicity", Pharm. Res. 16:1273-9 (1999).
Flotte, et al., "Gene therapy in cystic fibrosis" , Chest, 120 (3 suppl) 124S-131S (2001).
Freichels, et al., "Sugar-labeled and PEGylated (bio)degradable polymers intended for targeted drug delivery systems", Carbohydrate Polymers, 86(3):1093-1106 (2011).

(56) References Cited

OTHER PUBLICATIONS

Fuchs, et al., "Hypersmolar sexual lubricant causes epithelial damage in the distal colon: potential implication for HIV transmission", J. Infect. Dis., 195:703-710 (2007).
Gao, et al. (Lectin-conjugated PEG-PLA nanoparticles: preparation and brain delivery after intranasal administration, Biomaterials, 27:3482-3490 (2006).
Garabuzenko, et al., "Effect of grafted PEG on liposome size and on compressibility and packing of lipid bilayer", Chem. Phys. Lipids, 135:117-29 (2005).
Gaudana, et al., "Recent perspectives in ocular drug delivery", Pharm. Res., 26:1197-216 (2009).
Gelperina, et al. "Drug delivery to the brain using surfactant-coated poly (lactide-co-glycolide) nanoparticles: influence of the formulation parameters", European Journal of Pharmaceutics and Biopharmaceutics, 74(2):157-163 (2010).
Ghate, et al., "Pharmacokinetics of intraocular drug delivery by periocular injections using ocular fluorophotometry", Invest. Ophthalmol Visual Sci., 48:2230-7 (2007).
Giannavola, et al., "Influence of preparation conditions on Acyclovir-loaded poly-d, l-lactic acid nanospheres and effect of PEG coating on ocular drug bioavailability", Pharma. Res., 20(4):584-90 (2003).
Giese, et al., "Cost of Migration: Invasion of Malignant Gliomas and Implications for Treatment", Journal of Clinical Oncology, 21(8):1624-1636 (2003).
Gomez-Gaete, et al., "Encapsulation of dexamethasone into biodegradable polymeric nanoparticles", Int. J. Pharm., 331(2):153-9 (2007).
Gonzalez, et al., "Nanotechnology in corneal neovascularization therapy—a review", J. Ocul. Pharmacol. Ther., 29:124-34 (2013).
Gou, et al., "Synthesis, serf-assembly, and drug-loading capacity of well-defined cyclodextrin-centered drug-conjugated amphiphilic A 14 B 7 miktoarm star copolymers based on poly{[epsilon]-caprolactone) and Poly(ethylene glycol)", Biomacromolecules, 11(4):934-43 (2010).
Govender, et al., "PLGA nanoparticles prepared by nanoprecipitation: drug loading and release studies of a water soluble drug", J. Cont. Rel., 57:171-85 (1999).
Gref, et al., "Biodegradable long-circulating polymeric nanospheres", Science, 263(5153):1600-1603 (1994).
Gref, et al., "Stealth corona-core nanoparticles surface modified by polyethylene glycol (PEG): influences of the corona (PEG chain length and surfacedensity) and of the core composition on phagocytic uptake and plasma protein adsorption", Colloids Surf B. Biointerfaces, 18(3-4):301-13 (2000).
Gregory, et al., "Expression and characterization of the cystic fibrosis Transmembrane conductance regulator", Nature, 347:382-6 (1990).
Griesenbach and Alton, "Gene transfer to the lung: lessons learned from more than 2 decades of CF gene therapy", Adv. Drug Deliv. Rev., 61:128-39 (2009).
Grisanti and Ziemssen, "Bevacizumab: Off-label uses in ophthalmology", Indian J Ophthalmol., 55(6):417-20 (2007).
Heinz, et al., "Nanoparticle decoration with surfactants: Molecular interactions, assembly, and applications", Surface Science Reports, 72(1):1-58 (2017).
Hida, et al., "Common gene therapy viral vectors do not efficiently penetrate sputum from cystic fibrosis patients", PLoS One. 6:e19919 (2011).
Hill, "Immunosuppression in corneal transplantation", Eye, 9:247-53 (1995).
Holtmaat, et al., "Long-term, high-resolution imaging in the mouse neocortex through a chronic cranial window", Nat Protoc., 4(8):1128-44 (2009).
Hosseini, et al., "Pharmacokinetic study of dexamethasone disodium phosphate using intravitreal, subconjunctival, and intravenous delivery routes in rabbits", J. Ocular Pharmacol. Ther., 24:301-8 (2008).
Huang, et al., "Molecular aspects of muco- and bioadhesion: tethered structures and site-specific surfaces", J. Control. Release, 65(1-2):63-71 (2000).

Immordino, et al., "Stealth liposomes: review of the basic science, rationale, and clinical applications, existing and potential", Int. J. Nanomed., 1(3):297-315 (2006).
Ishihara, et al., "Efficient encapsulation of a water-soluble corticosteroid in biodegradable nanoparticles", Int. J. Pharm., 365:200-5 (2009a).
Ishihara, et al., "Role of zinc in formulation of PLGA/PLA nanoparticles encapsulating betamethasone phosphate and its release profile", J. Control Release, 105:68-76 (2005).
Ishihara, et al., "Polymer Nanoparticles encapsulating betamethasone phosphate with different release profiles and stealthiness", Int. J. Pharm., 375:148-54 (2009b).
Israelachvili, et al., "Physical Principles of Membrane Organization", Quarterly Reviews of Biophysics, 13(2): 121-200 (1980).
Ito, et al., "Update on glucocorticoid action and resistance", J. Allergy Clin. Immunol., 117:522-43 (2006).
Iwase, et al., "Safe and effective polymeric-doxorubicin conjugate nanoparticles for prolonged antiagiogenic activity in the eye", Retrieved from the internet: URL:http://www.abstractsonline.com/PlanNiewAbstract.aspx? (2013).
Jahangiri, et al., "Convection-enhanced delivery in glioblastoma: a review of preclinical and clinical studies", Journal of Neurosurgery, 126(1):191-200 (2017).
Jain, et al., "The manufacturing techniques of various drug loaded biodegradable poly (lactide-co-glycolide) (PLGA) devices", Biomaterials, 21(23):2475-90 (2000).
Jeong, et al., "Cellular recognition of paclitaxel-loaded polymeric nanoparticles composed of poly (y-benzyl-l-glutamate) and poly (ethylene glycol) diblock copolymer endcapped with galactose moiety", International Journal of Pharmaceutics, 29(1-2): 151-16 (2005).
Jiang, et al., "Efficiency of cationic lipid-mediated transfection of polarized and differentiated airway epithelial cells in vitro and in vivo", Hum. Gene. Ther. 9:1531-42 (1998).
Jiang, et al., "Intravitreal injections of GDNF-loaded biodegradable microspheres are neuroprotective in a rat model of glaucoma", Mol. Vis., 13: 1783-92 (2007).
Jokerst, et al., "Nanoparticle PEGylation for imaging and therapy", Nanomedicine (Lond), 6(4):715-728 (2011).
Jones and Rhee, "Corticosteroid-induced ocular hypertension and glaucoma: a brief review and update of the literature", Curr. Opin. Ophthalmol., 17:163-7 (2006).
Kemtong, "Polymeric nanomedicine for cancer MR imaging and drug delivery", Chem. Commun., 3497-3510 (2009a).
Kemtong, et al., "Nanoparticles for magnetic resonance imaging tracking and methods of making and using thereof", Chem. Communication, 3497-3510 (2009b).
Kichler, et al., "Intranasal gene delivery with a polyethylenimine-PEG conjugate", Journal Of Controlled Release, 81(3): 379-388 (2002).
Kim, "Synthesis and application of poly(ehtylene glycol)-co-poly([beta]-amino ester) copolymers for small cell lung cancer gene therapy", Acta Biomaterialia, 41:293-301 (2016.
Kim, et al., "Poly(amino ester)s-Based Polymeric Gene Carriers in Cancer Gene Therapy", Intech Open Science, 15:375-396 (2013).
Kleemann, et al., "Modified polyethylenimines as non-viral gene delivery systems for aerosol gene therapy: investigations of the complex structure and stability during air-jet and ultrasonic nebulization", Journal Of Controlled Release, 100 (3): 437-450 (2004).
Kleemann, et al., "Nano-carriers for DNA delivery to the lung based upon a TAT-derived peptide covalently coupled to PEG-PEI", Journal Of Controlled Release, 109(1-3):299-316 (2005).
Knauf, et al., "Relationship of effective molecular size to systemic clearance in rats of recombinant interleukin-2 chemically modified with water-soluble polymers", J. Biol. Chem., 263(29):15064-15070 (1988).
Kocbek, et al., "Preparation and evaluation of nanosuspensions for enhancing the dissolution of poorly soluble drugs", International Journal of Pharmaceutics, 312(1-2):179-186 (2006).
Kompella, et al., "Luteinizing hormone-releasing hormone agonist and transferrin functionalizations enhance nanoparticle delivery in a novel bovine ex vivo eye model", Mol. Vis., 12:1185-98 (2006).
Kompella, et al., "Recent advances in ophthalmic drug delivery", Ther. Deliv., 1:435-56 (2010).

(56) References Cited

OTHER PUBLICATIONS

Kompella, et al., "Subconjunctival nano- and microparticles sustain retinal delivery of budesonide, a corticosteroid capable of inhibiting VEGF expression", Invest. Ophthalmol Vis Sci., 44:1192-1201 (2003).
Kulkarni, et al., "Effects of surface modification on delivery efficiency of biodegradable nanoparticles across the blood-brain barrier", Nanomedicine (Lond)., 6(2):377-394 (2011).
Kume-Kick, et al., "Independence of extracellular tortuosity and volume fraction during osmotic challenge in rat neocortex", Journal of Physiology, 542(2):515-527 (2002).
Kunwar, et al., "Phase III randomized trial of CED of IL 13-PE38QQR vs Gliadel wafers for recurrent glioblastoma", Neuro Oncol., 12:871-81 (2010).
Kunwar, et al., "Direct intracerebral delivery of cintredekin besudotox (IL13-PE38QQR) in recurrent malignant glioma: a report by the Cintredekin Besudotox Intraparenchymal Study Group", J Clin Oncol., 25(7):837-44 (2007).
Lacey, et al., "Unacceptable side-effects associated with a hyperosmolar vaginal microbicide in a phase 1 trial", Int. J. STD AIDS, 21:714-7 (2007).
Lai, at al., "Mucus-penetrating nanoparticles for drug and gene delivery to mucosal tissues", Adv. Drug Deliver Rev., 61:158-71 (2009).
Lai, et al., "Nanoparticles reveal that human cervicovaginal mucus is riddled with pores larger than viruses", PNAS, 107:598-603 (2010).
Lai, et al., "Rapid transport of large polymeric nanoparticles in fresh undiluted human mucus", PNAS, 104:1482-7 (2007).
Langsjo, et al., "Effects of subanesthetic doses of ketamine on regional cerebral blood flow, oxygen consumption, and blood volume in humans", Anesthesiology, 99(3):614-23 (2003).
Lemoine, et al., "Mechanism of efficient transfection of the nasal airway epithelium by hypotonic shock", Gene Ther., 12(16):1275-85 (2005).
Lennemas, "Does fluid flow across the intestinal mucosa affect quantitative oral drug absorption? Is it time for a reevaluation?", Pharm Res., 12:1573-82 (1995).
Leonard, et al., "Screening of budesonide nanoformulations for treatment of inflammatory bowel disease in an inflamed 3D cell-culture model", Altex, 29(3):275-285 (2012).
Li, et al., "Microencapsulation by solvent evaporation: state of the art for process Engineering approaches", Int. J. Pharm., 363(1-2):26-39 (2008).
Li, et al., "Novel mucus-penetrating liposomes as a potential oral drug delivery U system: preparation, in vitro characterization, and enhanced cellular uptake .", International Journal of Nanomedicine, 6:3151-3162 (2011).
Liu, et al., "Developments of mucus penetrating nanoparticles", Asian Journal of Pharmaceutical Sciences, 10:275-282 (2015).
Liu, et al., "In vivo detection of DIACEST contrast agent labeled liposomes using MRI", Contrast Media & Molecular Imaging, 4(6): 294 (2009).
Liu, et al., "In vivo multicolor molecular MR imaging using diamagnetic chemical exchange saturation transfer liposomes", Magnetic Resonance in Medicine, 67(4):1106-1113 (2012).
Liu, et al., "Biologically active core/shell nanoparticles self-assembled from cholesterol-terminated PEG-TAT for drug delivery across the blood-brain barrier", Biomaterials, 29:1509-1517 (2008).
Ludwig, "The use of mucoadhesive polymers in ocular drug delivery", Adv. Drug Deliv Rev., 57(11):1595-1639 (2005).
Mackay, et al., "Distribution in brain of liposomes after convection enhanced delivery; modulation by particle charge, particle diameter, and presence of steric coating", Brain Research., 1035(2):139-153 (2005).
Maisel, et al., "Effect of surface chemistry on nanoparticle interaction with gastrointestinal mucus and distribution in the gastrointestinal tract following orla and rectal administration in the mouse", J. Control. Release, 197:48-57 (2015a).

Maisel, et al., "Enema ion compositions for enhancing colorectal drug delivery", J. Control. Release, 209:280-287 (2015b).
Maisel, et al., "Nanoparticles coated with high molecular weight PEG penetrate mucus and provide uniform vaginal and colorectal distribution in vivo", Nanomedicine, 11 (11): 1337-1343 (2016).
Makadia, et al., "Poly Lactic-co-Glycolic Acid (PLGA) as Biodegradable Controlled Drug Delivery Carrier", Polymers (Basel), 3(3):1377-1397 (2011).
Martini, et al., The bioadhesive properties of a triblock copolymer of 8-caprolactone and ethylene oxide, Int. J. Pharm., 113(2):223-229 (1995).
Mastorakos, et al., "Brain penetrating gene vectors for efficient gene transfer to the CNS", Mol. Therapy, 22(1):S50 (2014).
Mastorakos, et al., "Highly compacted biodegradable DNA nanoparticles capable of overcoming the mucus barrier for inhaled lung gene therapy", PNAS, 112(28):8720-5 (2015a).
Mastorakos, et al., Highly PEGylated DNA nanoparticles provide uniform and widespread gene transfer in the brain, Adv. Health Mater., 4(7):1023-33 (2015b).
Matsui, et al., "Loss of binding and entry of liposome-DNA complexes decreases transfection efficiency in differentiated airway epithelial cells", J. Biol. Chem. 272:1117-26 (1997).
Mcghee, et al., "Locally administered ocular corticosteroids—Benefits and risks", Drug Saf., 25:33-55 (2002).
McMahon, et al., " New multicolor polypeptide diamagnetic chemical exchange saturation transfer (DIACEST) contrast agents for MRI", Magnetic Resonance Med., 60(4):803-12 (2008).
Mead, et al., Targeted gene transfer to the brain via the delivery of brain-penetrating DNA nanoparticles with focused ultrasound, J Control Release, 223:109-117 (2016).
Memon, et al., "Optimization of formulation parameters on ocular loteprednol etabonate nanosuspension by media milling method", Int. J. Pharmacrut. Biol. Arch., 4:46-51 (2012).
Moench, et al., "Microbicide excipients can greatly increase susceptibility to genital herpes transmission in the mouse", BMC Infect. Dis., 10:331 (2010).
Monfardini, et al., "Stabilization of substances in circulation", Bioconj. Chem., 9(4):418-450 (1998).
Mundargi, et al., "Nano/micro technologies for delivering macromolecular therapeutics using poly (D,L-lactide-co-glycolide) and its derivatives", J. Control. Release, 125(3):193-209 (2008).
Nagarwal, et al., "Polymeric nanoparticulate system: a potential approach for ocular drug delivery", Journal of Controlled Release, 136:2-13 (2009).
Nam, et al., "New micelle-like polymer aggregates made from PEI-PLGA diblock copolymers: micellar characteristics and cellular uptake", BioMater., 24(12): 2053-2059 (2003).
Nance, et al., "A dense poly (ethylene glycol) coating improves penetration of large polymeric nanoparticles within brain tissue", Sci. Transl. Med., 4(149):149ra119) (2012).
Newman, et al., "Uptake of poly(D,L-lactic-co-glycolic acid) microspheres by antigen-presenting cells in vivo", J. Biomed. Mater. Res., 60(3):480-6 (2002).
Ng, Ocular Anatomy and Physiology (2nd ed.), Optometry Vis Sci., 86:1208 (2009).
Nguyen, et al., "Long-term topical steroid treatment improves graft survival following normal-risk penetrating keratoplasty", Am. J. Ophthalmol., 144:318-9 (2007).
Nicholson and Tao, "Hindered diffusion of high molecular weight compounds in brain extracellular microenvironment measured with integrative optical imaging", Biophys J., 65:2277-90 (1993).
Nimkoff, et al., "The effects of intravenous anesthetics on intracranial pressure and cerebral perfusion pressure in two feline models of brain edema", J. Crit. Care, 12(3):132-6 (1997).
Noach, et al., "Effect of anisotonic conditions of hydrophilic model compounds across monolayers of human colonic cell lines", J Pharmacol. Exp. Ther., 270: 1373-80 (1994).
Ogris, et al., "PEGylated DNA/transferrin-PEI complexes: reduced interaction with blood components, extended circulation in blood and potential for systemic gene delivery", Gene Ther., 6:595-605 (1999).

(56) References Cited

OTHER PUBLICATIONS

Okamoto, et al., Transgenic mice with increased expression of vascular endothelial growth factor in the retina: a new model of intraretinal and subretinal neovascularization, Am. J. Pathol. 151:281-291 (1997).
Olmsted, et al., "Diffusion of macromolecules and virus-like particles in human cervical mucus", Biophys. J., 81 (4):1930-1937 (2001).
Owen, et al., "Factors influencing ilonoxyHpl-9 permeation and bioactivity in cervical mucus", J. Control. Release, 60:23-34(1999).
Owens, et al., "Opsonization, biodistribution, and pharmacokinetics of polymeric nanoparticles", Int. J. Pharm., 307 (1):93-1 02 (2006).
Pai, et al., "Current concepts in intravitreal drug therapy for diabetic retinopathy", Saudi J. Ophthalmol., 24:143-9 (2010).
Pappas and Purpura, "Distribution of colloidal particles in extracellular space and synaptic cleft substance of mammalian cerebral cortex", Nature, 210 (5043):1391-2 (1966).
Peeters, et al., "Can Ultrasound Solve the Transport Barrier of the Neural Retina", Pharm. Res. 25(11):2657-2665 (2008).
Peppas, et al., "Hydrogels as mucoadhesive and bioadhesive materials: a review", Biomaterials, 17(16):1553-1561 (1996).
Peppas, et al., "Molecular aspects of mucoadhesive carrier development for drug delivery and improved absorption", J. Biomater. Sci. Polym. Ed., 20(1):1-20 (2009).
Peppas, et al., "Molecular calculations of poly(ethylene glycol) transport across a swollen poly(acrylic acid)/mucin interface", J. Biomater. Sci. Polym. Ed., 9(6):535-542 (1998).
Peppas, et al., "Nanoscale technology of mucoadhesive interactions", Adv. Drug. Deliv. Rev., 56(11 ):1675-1687 (2004).
Peracchia, et al., "PEG-coated Nano spheres from amphiphilic diblock and multiblock copolymers: Investigation of their drug encapsulation and release characteristics", Journal of Controlled Release, 46, Issue 3:223-231 (1997).
Petri, et al., "Chemotherapy of brain tumour using doxorubicin bound to surfactant-coated poly(butyl cyanoacrylate) nanoparticles: revisiting the role of surfactants", Journal of Controlled Release, 117(1):51-58 (2007).
Pihl, et at, "Comparative 'study of the effect of luminal hypotonicity on mucosal permeability in rat upper gastrointestinal tract", Acta Physiol., 193:67-78 (2008).
Pitto-Barry, et al., "Pluronic® block-copolymers in medicine: from chemical and biological versatility to rationalisation and clinical advances", Polymer Chemistry, 5(10):3291-3297 (2014).
Popielarski, et al., "A nanoparticle-based model delivery system to guide the rational design of gene delivery to the liver. 1. Synthesis and characterization", Bioconjug. Chem., 16(5):1063-70 (2005).
Proia, et al., "The effect of angiostatic steroids and beta-cyclodextrin tetradecasulfate on corneal neovascularization in the rat", Exp. Eye. Res., 57:693-8 (1993).
Rajapaksa, et al., "Intranasal M cell uptake of nanoparticles is independently influenced by targeting ligands and buffer ionic strength", J. Biol. Chem., 285:23739-46 (2010 ).
Randleman, et al., "Prevention and treatment of corneal graft rejection: Current practice patterns (2004)", Cornea, 25:286-90 (2006).
Rautio, et al., "Prodrugs: design and clinical applications", Nat. Rev. Drug Discov., 7:255-70 (2008).
Ravel, et al,, "Vaginal microbiome of reporductive-age women", PNAS, 108(1):4680-4687 (2011).
Recinos, et al., "Combination of intracranial temozolomide with intracranial carmustine improves survival when compared with either treatment alone in a rodent glioma model", Neurosurgery, 66(3):530-537 (2010).
Regnier-Delplace, et al., "PLGAs bearing carboxylated side chains: novel matrix formers with improved properties for controlled drug delivery", J Control Release, 166(3) :256-67 (2013) Abstract Only.
Reimondez-Troitiijo, et al., "Nanotherapies for the treatment of ocular diseases", Eu. J. Pharm. Biopharm, 95:279-93 (2015).
Rhen and Cidlowski, "Antiinflammatory action of glucocorticoids—New mechanisms for old drugs", N. Engl. J. Med., 353:1711-23 (2005).
Rich, et al., "Expression of cystic fibrosis transmembrane conductance regulator corrects defective chloride channel regulation in cystic fibrosis airway epithelial cells", Nature, 347:358-62 (1990).
Riordan, et al., "Identification of the cystic fibrosis gene: cloning and characterization of complementary DNA", Science, 245:1066-73 (1989).
Rosso, et al., "A new model for prediction of drug distribution in tumor and normal tissues: pharmacokinetics of temozolomide in glioma patients", Cancer Res., 69(1):120-7 (2009).
Rudolph, et al., "Aerosolized nanogram quantities of plasmid DNA mediate highly efficient gene delivery to mouse airway epithelium", Mol. Ther., 12:493-501 (2005).
Sagong, et al., "Intravitreal becacizumab for the treatment of neovascular Glaucoma associated with central retinal artery occlusion", Koren J. Ophthalmol., 3:215-8 (2009).
Sahib, et al., "Solubilization of beclomethasone dipropionate in sterically stabilized phospholipid nanomicelles (SSMs): physicochemical and in vitro evaluations", Drug Des Dev Ther., 6:29-42 (2012).
Sahlin, et al., "Enhanced hydrogel adhesion by polymer interdiffusion: use of linear poly(ethylene glycol) as an adhesion promoter", J. Biomater. Sci. Polym. Ed., 8(6):421-436 (1997).
Saishin, et al., "VEGF-TRAP(R1 R2) suppresses choroidal neovascularization and VEGF-induced breakdown of the blood-retinal barrier", J. Cell Physiol., 195:241-8 (2003).
Saito, et al., "Convection-enhanced Delivery of Therapeutics for Malignant Gliomas., Neurologia medico-chirurgica", 57:8-16 (2017).
Salopek, et al. Measurement and application of zeta-potential, Rudarsko-geolosko-naftni zbornik, vol. 4, pp. 147-151 (1992).
Sampson, et al., "Poor drug distribution as a possible explanation for the results of the Precise trial", J Neurosurg., 113(2):301-9 (2010).
Sanders, et al., "Cystic fibrosis sputum: a barrier to the transport of nanospheres", Am. J. Respir. Crit. Care Med., 162:1905-11 (2000).
Sanders, et al., "Extracellular barriers in respiratory gene therapy", Advanced Drug Delivery Reviews, 61(2): 115-127 (2009).
Saucier-Sawyer, et al., "Distribution of polymer nanoparticles by convection-enhanced delivery to brain tumors", Journal of Controlled Release, 232:103-112 (2016).
Scheule, et al., "Basis of pulmonary toxicity associated with cationic lipid mediated gene transfer to the mammalian lung", Hum. Gene Ther., 8:689-707.
Schuster, et al., "Nanoparticle diffusion in respiratory mucus from humans without lung disease", Biomaterials, 34 (13):3439-3446 (2013).
Schwedler, et al., "Cerebral blood flow and metabolism following ketamineadministration", Can Anaesth Soc J., 29(3):222-6 (1982).
Seguro, et al., "Long-term complications of past glucocorticoid use", Autoimmun. Rev., 12:629-32 (2013).
Sempere, et al., "MRI evaluation of inflammatory activity in Crohn's disease", American Journal of Roentgenology, 184(6):1829-35 (2005).
Seo, et al., "Nanomaterials for convection-enhanced delivery of agents to treat brain tumors", Current Opinion in Biomedical Engineering., 4:1-12 (2017).
Serra, et al., "Design of poly(ethylene glycol)-tethered copolymers as novel mucoadhesive drug delivery systems", Eur. J. Pharm. Biopharm., 63(1 ):11-18 (2006).
Sharma, et al., "Effect of process and formulation variables on the preparation of parenteral paclitaxel-loaded biodegradable polymeric nanoparticles: A co-surfactant study", Asian Journal of Pharmaceutical Sciences, 11(3):404-416 (2016).
Shelke, et al., "Intravitreal poly(L-lactide) microparticles sustain retinal and choroidal delivery of TG-0054, a hydrophilic drug intended for neovascular diseases", Drug Deliv. Transl. Res., 1 :76-90 (2011).
Sheng, et al., "In vitro macrophage uptake and in vivo biodistribution of PLA-PEG nanoparticles loaded with hemoglobin as blood substitutes: effect of PEG content", J. Mat. Sci: Materials In Medicine, 20(9):1881-1891 (2009).

(56) References Cited

OTHER PUBLICATIONS

Sherry, "Chemical Exchange Saturation Transfer Contrast Agents for Magnetic Resonance Imaging", Annu. Rev. Biomed. Eng., 10:391-411 (2008).
Shimazaki, et al., "Efficacy and safety of long-term corticosteroid eye drops after penetrating keratoplasty: A prospective, randomized, clinical trial", Ophthalmol., 119:668-73 (2012).
Short, "Safety Evaluation of Ocular Drug Delivery Formulations: Techniques and Practical Considerations", Toxicologic Pathology, 36:49-62 (2008).
Singh, et al., "Cationic microparticles: A potent delivery system for DNA vaccines", PNAS, 98(2):811-6 (2000).
Singleton, et al., "Convection enhanced delivery of panobinostat (LBH589)-loaded pluronic nano-micelles prolongs survival in the F98 rat glioma model", International Journal of Nanomedicine., 12:1385-1399 (2017).
Smart, et al., The basic and underlying mechanisms of mucoadhesion, Adv. Drug Deliv. Rev., 57(11 ):1556-1568 (2005).
Smith, The structure of the human vaginal mucosa in relation to the menstrual cycle and to pregnancy, Am. J. Anat., 54( 1 ):27-85 (1934).
Smith, et al., "Oxygen-induced retinopathy in the mouse", Invest. Ophthalmol. Vis. Sci. 35:101-111 (1994).
Sobczak, et al., "Synthesis and characterization of polyester conjugates of ciprofloxacin" , Eu. J. Med Chem., 45(9):3844-9 (2010).
Song, et al., "Surface chemistry governs cellular tropism of nanoparticles in the brain", Nature Communications., 8:15322 (2017).
Song, et al., Quantitative CEST imaging with reduced MT interference using dual-frequency irradiation, Proceedings Intl Soc Magnetic Resonance Med, 20:4190 (2012).
Soppimath, et al., "Biodegradable polymeric nanoparticles as drug delivery devise" , J. Cont. Release, 70(1-2):1-20 (2001).
Stary, et al., "A mucosal vaccine against Chlamydia trachomatis generates two waves of protective memory T cells", Science, 348(6241):aaa8205-aaa8205 (2015).
Sterchak, et al., "Unchanged stereoregular nucleic acid analogues I Synthesis 88 of a cytosine-containing oligomer with carbonate internucleoside linkages" , J Organic Chem., 52:4202 (1987).
Suh, et al., "PEGylation of nanoparticles improves their cytoplasmic transport" , Int. J. Nanomedicine, 2(4):735-41 (2007).
Suh, et al., "Real-time multiple-particle tracking: applications to drug and gene delivery" , Adv. Drug Deliv Rev., 57:63-78 (2005).
Suh, et al., "Efficient active transport of gene nanocarriers to the cell nucleus" , PNAS, 100:3878-82 (2003).
Suk, et al., "Gene delivery to differentiated neurotypic cells with RGD and HIV Tat peptide functionalized polymeric nanoparticles" , Biomaterials, 27:5143-50 (2006).
Suk, et al., "Lung Gene Therapy with Highly Compacted DNA Nanoparticles that Overcome the Mucus Barrier", J. Control Release, 178:8-17 (2014).
Suk, et al., "N-acetylcysteine enhances cystic fibrosis sputum penetration and 92 airway gene transfer by highly compacted DNA nanoparticles", Mol. Ther. 19:1981~9 (2011a).
Suk, et al., "Quantifying the intracellular transport of viral and nonviral gene vectors in primary neurons" , Exp Bioi Med., (Maywood) 232(3):461-9 (2007).
Suk, et al., "The penetration of fresh undiluted sputum expectorated by cystic fibrosis patients by non-adhesive polymer nanoparticles", Biomaterials, 30(13): 2591-2597 (2009).
Sykova and Nicholson, "Diffusion in brain extracellular space" , Physiol Rev., 88(4):1277-340 (2008).
Szulczyk, et al., "The effect of acute rise in intracranial pressure on the sympathetic cardiac, vertebral and phrenic nerve activities" , Acta Physiol Pol., 27 (1):1-8 (1976).
Tabbara, "Pharmacologic strategies in the prevention and treatment of corneal transplant rejection", Int. Ophthalmol., 28:223-32 (2008).
Tanaka, et al., "Development of cell-penetrating peptide-modified MPEG-PCL diblock copolymeric nanoparticles for systemic gene delivery", Int. J. Pharmac., 396(1-2):229-38 (2010).

Tang, et al., "Biodegradable polymer nanoparticles that rapidly penetrate the human mucus barrier" , PNAS, 106:19268-73 (2009).
Tang, et al., "Enhanced efficacy of local etoposide delivery by poly(etheranhydride) particles against small cell lung cancer in vivo" , Biomaterials, 31 :339-44 (2010).
Tang, et al., "Polyethylene glycol modified polyethylenimine for improved CNS gene transfer: effects of PEGylation extent" , Biomaterials, 24(13):2351-62 (2003).
Terry, "Ternary particles for effective vaccine delivery to the pulmonary system", (Ph.D. Thesis, UMI ProQuest, Ann Arbor (2008).
Thorne, et al., "In vivo diffusion analysis with quantum dots and dextrans predicts the width of brain extracellular space", Proc Natl Acad Sci U S A, 103(14):5567-5572 (2006).
Tobe, et al., "Targeted disruption of the FGF2 gene does not prevent choroidal Neovascularization in a murine model", Am. J. Pathol. 153:1641-1646 (1998).
Tyler, et al., "A thermal gel depot for local delivery of paclitaxel to treat experimental brain tumors in rats", Journal of Neurosurgery, 113(2):210-217 (2010).
Valentine, et al., "Colloid surface chemistry critically affects multiple particle tracking measurements of biomaterials" • Biophys J., 86(6):4004-14 (2004).
Van Der Valk, et al., "Intraocular Pressure-Lowering Effects of All Commonly Used Glaucoma Drugs", Ophthalmology, 112(7): 1177-1185 (2005).
Van Harreveld and Trubatch, "Progression offusion during rapid freezing or electron microscopy" , J Microsc., 115(3):243-56 (1979).
Vandervoort, "Ocular drug delivery: nanomedicine applications", Nanomedicine, 2:11-21 (2007).
Vega, et al., "Flurbiprofen loaded biodegradable nanoparticles for ophtalmic administration", J. Pharm. Sci. 95(11):2393-2405 (2006).
Vellimana, et al., "Combination of paclitaxel thermal gel depot with temozolomide and radiotherapy significantly prolongs survival in an experimental rodent glioma model", Journal of Neuro-Oncology, 111:229-236 (2013).
Veronese, et al., "PEG-doxorubicin conjugates: influence of polymer structure on drug release, in vitro cytotoxicity, biodistribution, and antitumor activity", Bioconjig Chem., 16 (4):775-84 (2005).
Vladimir, "Multifunctional nanocarriers", Advanced Drug Delivery Reviews, 1532-1555 (2006).
Voynow and Rubin, "Mucins, mucus, and sputum", Chest, 135:505-12 (2009).
Wadhwa, et al., "Nanocarriers in ocular drug delivery: An update review", Curro Pharm. Des., 15:2724-50 (2009).
Wang, et al., "Addressing the PEG mucoadhesivity paradox to engineer nanoparticles that "slip" through the human mucus barrier", Angew Chem . Int. Ed. Engl., 47(50):9726-9 (2008).
Ward, et al., "A new class of contrast agents for MRI based on proton chemical exchange dependent saturation transfer (CEST)", J. Magnetic Resonance, 143:79-87 (2000).
Weijtens, et al., "Dexamethasone concentration in the subretinal fluid after a subconjunctival injection, a peribulbar injection, or an oral dose", Ophthalmol., 107:1932-8 (2000).
Weijtens, et al., "High concentration of dexamethasone in aqueous and vitreous after subconjunctival injection", Am. J. Ophthalmol., 128:192-7 (1999).
Weijtens, et al., "Intraocular penetration and systemic absorption after topical application of dexamethasone disodium phosphate", Ophthalmol., 109: 1887-91 (2002).
Wolak, et al., "Diffusion of macromolecules in the brain: implications for drug delivery", Molecular Pharmaceutics, 10(5):1492-1504 (2013).
Xiao, et al., "Diffusion of flexible random-coil dextran polymers measured in anisotropic brain extracellular space by integrative optical imaging" , Biophys J., 95:1382-92 (2008).
Xu, et al. , "Nanotechnology approaches for ocular drug delivery", Middle East Afr. J. Ophthalmol., 20:26-37 (2013).
Xu, et al., "Impacts of surface polyethylene glycol (PEG) density on biodegradable nanoparticle transport in mucus ex vivo and distribution in vivo", ACS Nano, 9(9):9217-9227 (2015).
Xu, et al., "Scalable method to produce biodegradable nanoparticles that rapidly penetrate human mucus", J. Control. Release, 170(2):279-86 (2013b).

(56) References Cited

OTHER PUBLICATIONS

Xu, et al., "Intracellular drug delivery by poly(lactic-co-glycolic acid) nanoparticles", revisited, Molecular Pharmaceutics, 6:190-201 (2009).

Yadav, et al., "Evaluations of combination MDR-1 gene silencing and paclitaxel administration in biodegradable polymeric nanoparticles formulations to overcome multidrug resistance in cancer cells", Cancer Chemo Pharma., 63(4):711-22 (2009).

Yamaoka, et al., "Distribution and tissue uptake of poly(ethylene glycol) with different molecular weights after intravenous administration to mice", J. Pharm. Sci., 83(4):601-606 (1994).

Yang, et al., "Biodegradable nanoparticles composed entirely of safe materials That Rapidly penetrate human mucus", Agnew. Chem. Int, Ed., 50:2597-2600 (2011).

Yang, et al., "Evading immune cell uptake and clearance requires PEG grafting at densities substantially exceeding the minimum for brush conformation", Mol. Pharm., 11 (4):1250-1258 (2014).

Yang, et al., "Vaginal delivery of paclitaxel via nanoparticles with non-mucoadhesive surfaces suppresses cervical tumor growth", Adv. Healthc. Mater., 3(7):1044-1052 (2014b).

Yang, et al., "Cell-Penetrating Peptides: Efficient Vectors for Vaccine Delivery", Current Drug Delivery, 16(5): 430-443 (2019).

Yang, et al., "Production of virus-mimetic mucus-penetrating particles for drug and gene delivery in mucosal tissues", Annual Meeting of AICHE Science and Engineering Forum, Nov. 16, 2021, Abstract 705B (2008).

Yen, et al., "Controlled Surface Modification with Poly (ethylene) glycol Enhances Diffusion of PLGA Nanoparticles in Human Cervical Mucus", J. Contr . Rel., 158(2):258-264 (2011).

Yokoyama, et al., "Characterization and anticancer activity of the micelle-forming polymeric anticancer drug Adriamycin-conjugated poly (ethylene glycol)-poly(aspartic acid) block copolymer", Cancer Res., 50: 1693-1700 (1990).

Yong, et al., "Poly([beta]-Amino Esters): Synthesis, Formulations, and Their Biomedical Application", Advanced Healthcare Materials, 1801359 (2018).

Yoshida, et al., "Digoxin inhibits retinal ischemia-induced HIF-1 atpha expression and ocular neovascularization", FASEB J., 24:1759-1767 (2010).

Zeitlin, et al., "Tests of Vaginal Microbicides in the Mouse Genital Herpes Model", Contraception, 56:329-335 (1997).

Zhan, et al., "Convection enhanced delivery of liposome encapsulated doxorubicin for brain tumour therapy", Journal of Controlled Release, 285:212-229 (2018).

Zhang, et al., "Micelles based on biodegradable poly(L-glutamic acid)-b-polylactide with paramagnetic Gd ions chelated to the shell layer as a potential nanoscale MRI-visible delivery system", Biomacromolecules, 9:36-42 (2008).

Zhang, et al., "The effect of corticosteroid and cyclosporin A on murine corneal allograft rejection", Graefes Arch. Clin. Exp. Ophthalmol., 238:525-30 (2000).

Zhang, et al., "Strategies to enhance the distribution of nanotherapeutics in the brain", Journal of Controlled Release, 267:232-239 (2017).

Zheng, et al., "Lactobacilli Inactivate Chlamydia trachomatis through Lactic Acid but Not H202", 9(9):e107758 (2014).

Zhou, et al., "Highly penetrative, drug-loaded nanocarriers improve treatment of glioblastoma", Proc Natl Acad Sci U S A, 110(29):11751-11756 (2013).

Zimmer, et al., "Microspheres and nanoparticles used in ocular delivery systems", Advanced Drug Delivery Reviews, 16:61-73 (1995).

Zugates, et al., "Gene delivery properties of end-modified poly([beta]-amino ester)'s", Bioconjug. Chem., 18(6): 1887-96 (2007).

Jaraswekin, et al., "Effect of poly(lactide-co-glycolide) molecular weight on the release of dexamethasone sodium phosphate from microparticles", Journal of Microencapsulation, 24:2, 117-128) (2007).

Negron et al., "A Highly Translatable Dual-arm Local Delivery Strategy To Achieve Widespread Therapeutic Coverage in Healthy and Tumor-bearing Brain Tissues" Advanced Science News; 2207278 (2023).

Office Action in U.S. Appl. No. 17/602,664 mailed May 5, 2025.

* cited by examiner

NANOPARTICLES FOR DRUG DELIVERY TO BRAIN

CROSS-REFERENCE TO RELATED APPLICATIONS

This application claims benefit of U.S. Provisional Application No. 62/832,770, filed on Apr. 11, 2019, which is hereby incorporated herein by reference in its entirety.

STATEMENT REGARDING FEDERALLY SPONSORED RESEARCH

This invention was made with government support under Grant R01CA164789, R01EB020147, R01CA197111, R01CA220841, and R01CA204968 awarded by the National Institutes of Health. The government has certain rights in the invention.

FIELD OF THE INVENTION

The invention is generally in the field of drug delivery, and in particular, a method of delivering drugs to the brain using coated particles to penetrate brain tissue.

BACKGROUND OF THE INVENTION

While the blood brain barrier has long been considered the crucial interface for therapeutic efficacy within the CNS, more recently poor distribution of agents within the brain itself has emerged as a major delivery challenge. See Arifin, et al. *Pharm Res* 26, 2289 (2009), Bobo et al., *Proc Natl Acad Sci USA* 91, 2076 (1994), Kunwar et al., *Neuro Oncol* 12, 871 (2010), Kunwar et al., *J Clin Oncol* 25, 837 (2007), Rosso et al., *Cancer Res* 69, 120 (2009), and Sampson et al., *J Neurosurg* 113, 301 (2010).

The extracellular space (ECS) in the brain represents the major pathway for movement of many signaling molecules and metabolites as well as therapeutic and diagnostic substances. This space between cells comprises 15-20% of the total brain volume, contains charged and hydrophobic regions, and shifts with changes in cerebral metabolic activity, blood flow, and spinal fluid dynamics. Importantly, the ECS may be more complex in certain pathogenic states, such as intrinsic invasive brain tumors.

Achieving widespread distribution in the brain parenchyma is essential when it comes to the design of therapeutic nanoparticles (NPs) for treating brain diseases (1, 2). NPs delivery systems used for the treatment of brain tumors and other CNS diseases is challenging due to the presence of multiple anatomical and physiological barriers (e.g. bloodbrain barrier, stability in blood circulation, brain tissue barrier, drug clearance form cerebrospinal fluid, high vascularity, and tissue heterogeneity). Furthermore, the lack of efficacy of locally delivered systems stem from the impaired diffusional capabilities of the chemotherapeutic released after infusion. This limits their application for long-term treatment regimens, further supporting a need for a NP platform that can penetrate within the brain and provide sustained release of a therapeutic.

It is therefore an object of the present invention to provide the particle characteristics that enable maximum drug loading and release times for delivery of therapeutic, prophylactic and diagnostic agents to the brain, while optimizing or maximizing penetration.

It is a further object of the present invention to provide methods to assist the delivery of these particles to further enhance the penetration and delivery of the cargo of these particles to the brain.

SUMMARY OF THE INVENTION

Dosage formulations containing nanoparticles, particularly nanoparticles which exhibit increased rates of diffusion through the brain parenchyma, and methods of making and using thereof, are described herein. In a particular embodiment, the nanoparticles have encapsulated therein and/or associated with the surface of the particles, one or more therapeutic, prophylactic, and/or diagnostic agents.

Generally, the nanoparticles are made up entirely of Generally Recognized As Safe (GRAS) materials, in compliance with the regulations provided by the U.S. Food and Drug Administration in sections 201(s) and 409 of the Federal Food, Drug, and Cosmetic Act and 21 C.F.R. 170 and 181-186. In one embodiment, the core is made up with one or more hydrophobic polymers, preferably poly(lactic acid-co-glycolic acid) (PLGA) or other biodegradable, biocompatible polymer such other poly(hydroxy acids), polyanhydrides, and polyhydroxybutyrates such as PHB3 and PHB4.

In a particular embodiment, the particles are coated with one or more materials which facilitate or enhance diffusion of the particles, particularly through the brain. The coating material can be a surfactant or a hydrophilic material, such as a hydrophilic polymer. In one embodiment, the material is a triblock copolymers of polyethylene oxide-polypropylene oxide-polyethylene oxide (PEO-PPO-PEO), available commercially as a PLURONIC® or POLOXAMER®. In one embodiment, the particles are densely coated with the coating material. In a particular embodiment, the density of the coating is such that the surface of the particle is near-neutral as measured by the zeta potential of the surface and/or the particles exhibit significantly reduced adhesion to tissue compared to uncoated particles. In another embodiment, the density of the coating is such that the particle penetrates brain tissue at a rate significantly faster than an uncoated particle. The density of the coating can be expressed as units per $nm^2$ or as the ratio of the mass of the coating to the mass of the particle or as the weight percent of the coating.

In one embodiment, the particles have an average size (e.g., diameter) from about 60 to about 230 nm, between 80 and 230 nm, preferably from about 80 to about 150 nm, or more preferably between about 150 and about 230 nm. In another embodiment, the particles have an average size (e.g., diameter) from about 150 and about 230 nm, such as 150, 160, 170, 180, 190, 200, 210, 220 nm.

The nanoparticles can be combined with one or more pharmaceutically acceptable excipients and/or carriers to form pharmaceutical formulations. The formulations can be administered directly or indirectly to the brain using methods of administration known in the art. In preferred embodiment, the nanoparticles are directly injected to the brain via intracranial administration by convection enhanced delivery ("CED").

The nanoparticles are formulated to release an effective amount of the therapeutic, prophylactic, or diagnostic agent over a period of at least 10 minutes, 20 minutes, 30 minutes, one hour, two hours, hour hours, six hours, ten hours, one day, three days, seven days, ten days, two weeks, one month, or longer.

The nanoparticles can be formulated with an osmolality between about 300 mOsm/kg and about 1000 mOsm/kg, preferably between about 400 mOsm/kg and about 800 mOsm/kg, effective to increase volumetric distribution of the nanoparticles at the site of administration in the brain relative to an equivalent formulation with an osmolality of less than 300 mOsm/kg. Statistically significant improvement of therapeutic distribution enabled by these non-adhesive, brain-permeable nanoparticles and osmosis-driven brain extracellular matrix (ECM) modulation will significantly enhance drug and gene delivery within the CNS, offering higher drug payload, improved drug loading efficiency, and significantly longer drug release durations.

As demonstrated by the examples, nanoparticles (NPs) have been developed that provide widespread and sustainable delivery of small-molecule drugs to the brain solely based on generally recognized as safe (GRAS) materials, including poly (lactic-co-glycolic acid) (PLGA) and triblock copolymers of polyethylene oxide-polypropylene oxide-polyethylene oxide (PEO-PPO-PEO), also used as surfactants, which provides a clear regulatory path for the safety assessment in the clinic. A family of PEO-PPO-PEO surfactant polymers, Pluronic F68, F98, and F127, possessing a range of relative molecular weights of PEO and PPO was tested and a lead polymer that provides most stably surface non-adhesive coatings for efficient particle penetration through the brain tissue was demonstrated. NPs as large as ~200 nm in diameters can efficiently penetrate the brain parenchyma when the NPs surfaces are coated with the lead PEO-PPO-PEO, Pluronic F127. This is of importance as the largest NPs previously shown to efficiently penetrate the brain tissues possessed diameters of ~110 nm and larger NPs allows delivery of a wider array of drugs to the brain at higher drug concentrations.

The examples also demonstrate the use of a simple osmotic method to non-invasively and temporarily increase the pore sizes of brain ECM, thereby further enhancing distribution of therapeutic NPs in the brain. Synergistic improvement of therapeutic distribution enabled by non-adhesive, brain-permeable NPs and osmosis-driven ECM modulation will likely be a game-changer for brain therapy given that most of the neurological disorders, including malignant gliomas, are characterized by widespread disease areas within the brain The ability to achieve brain penetration with larger particles will significantly improve drug and gene delivery within the CNS since larger particles offer higher drug payload, improved drug loading efficiency, and significantly longer drug release durations.

BRIEF DESCRIPTION OF THE DRAWINGS

FIG. 6A shows tumor bulk in coronal and sagittal views. FIG. 6B shows areas where F127/PLGA NPs are surrounding the tumor in coronal and sagittal views. Scale bar=2 mm. 3D-rendered representation depicting orthotopic F98-mKate brain tumors and the volumetric distribution of F127/PLGA NPs (grey outline) in the tumor bulk, obtained by stacking multiple sequential confocal images.

DETAILED DESCRIPTION OF THE INVENTION

I. Definitions

Figure 1A:
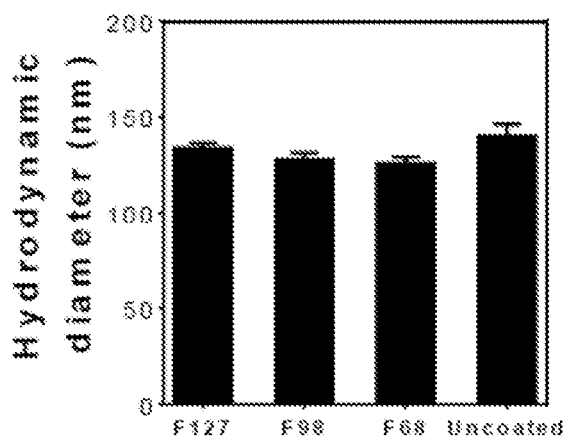
FIGS. 1A-1B are bar graphs showing (FIG. 1A) hydrodynamic diameters of 30 mg/ml PLGA NPs measured by DLS in 10 mM NaCl at pH 7.0. Mean±SEM (n 3) and (FIG. 1B) ζ-potential of uncoated NPs or coated NPs with Pluronic solutions, F68, F98, and F127 measured by laser doppler anemometry in 10 mM NaCl at pH 7.0. Mean±SEM (n≥3).

The term "biocompatible" as used herein refers to one or more materials that are neither themselves toxic to the host (e.g., an animal or human), nor degrade (if the material degrades) at a rate that produces monomeric or oligomeric subunits or other byproducts at toxic concentrations in the host.

The term "biodegradable" as used herein means that the materials degrades or breaks down into its component subunits, or digestion, e.g., by a biochemical process, of the material into smaller (e.g., non-polymeric) subunits.

The term "corresponding particle" or "reference particle" as used herein refers to a particle that is substantially identical to another particle to which it is compared, but typically lacking a surface modification to promote transport differences through the pores in the ECS of the brain. A corresponding particle may be of similar material, density, and size as the particle to which it is compared. In certain embodiments, a corresponding particle is a carboxyl-modified polystyrene (PS) particle, e.g., available from Molecular Probes, Eugene, OR. In certain embodiments, a comparable particle is a polystyrene particle that has carboxyl, amine or sulfate aldehyde surface modifications.

The term "DNA" refers to a polymer of deoxynucleotides. Examples of DNA include plasmids, gene therapy vector, and a vector designed to induce RNAi.

The term "diameter" is art-recognized and is used herein to refer to either of the physical diameter or the hydrodynamic diameter. The diameter of an essentially spherical particle may refer to the physical or hydrodynamic diameter. The diameter of a nonspherical particle may refer preferentially to the hydrodynamic diameter. As used herein, the diameter of a non-spherical particle may refer to the largest linear distance between two points on the surface of the particle. When referring to multiple particles, the diameter of the particles typically refers to the average diameter of the particles. Particle diameter can be measured using a variety of techniques in the art including, but not limited to, dynamic light scattering.

"Sustained release" as used herein refers to release of a substance over an extended period of time in contrast to a bolus type administration in which the entire amount of the substance is made biologically available at one time.

The term "microspheres" is art-recognized, and includes substantially spherical colloidal structures, e.g., formed from biocompatible polymers such as subject compositions, having a size ranging from about one or greater up to about 1000 microns. In general, "microcapsules," also an art-recognized term, may be distinguished from microspheres, because microcapsules are generally covered by a substance of some type, such as a polymeric formulation. The term "microparticles" is also art-recognized, and includes microspheres and microcapsules, as well as structures that may not be readily placed into either of the above two categories, all with dimensions on average of less than about 1000 microns. A microparticle may be spherical or nonspherical and may have any regular or irregular shape. If the structures are less than about one micron in diameter, then the corresponding art-recognized terms "nanosphere," "nanocapsule," and "nanoparticle" may be utilized. In certain embodiments, the nanospheres, nanocapsules and nanoparticles have an average diameter of about 500 nm, 200 nm, 100 nm, 50 nm, 10 nm, or 1 nm.

A composition containing microparticles or nanoparticles may include particles of a range of particle sizes. In certain embodiments, the particle size distribution may be uniform, e.g., within less than about a 20% standard deviation of the mean volume diameter, and in other embodiments, still more uniform, e.g., within about 10% of the median volume diameter.

The term "particle" as used herein refers to any particle formed of, having attached thereon or thereto, or incorporating a therapeutic, diagnostic or prophylactic agent, optionally including one or more polymers, liposomes micelles, or other structural material. A particle may be spherical or nonspherical. A particle may be used, for example, for diagnosing a disease or condition, treating a disease or condition, or preventing a disease or condition.

The phrases "parenteral administration" and "administered parenterally" are art-recognized terms, and include modes of administration other than enteral and topical administration, such as injections, and include without limitation intravenous, intramuscular, intrapleural, intravascular, intrapericardial, intraarterial, intrathecal, intracapsular, intraorbital, intracardiac, intradermal, intraperitoneal, transtracheal, subcutaneous, subcuticular, intraarticular, subcapsular, subarachnoid, intraspinal and intrasternal injection and infusion.

The term "surfactant" as used herein refers to an agent that lowers the surface tension of a liquid.

The term "therapeutic agent" refers to an agent that can be administered to prevent or treat a disease or disorder. Examples include, but are not limited to, a nucleic acid, a nucleic acid analog, a small molecule, a peptidomimetic, a protein, peptide, carbohydrate or sugar, lipid, or surfactant, or a combination thereof.

The term "treating" preventing a disease, disorder or condition from occurring in an animal which may be predisposed to the disease, disorder and/or condition but has not yet been diagnosed as having it; inhibiting the disease, disorder or condition, e.g., impeding its progress; and relieving the disease, disorder, or condition, e.g., causing regression of the disease, disorder and/or condition. Treating the disease or condition includes ameliorating at least one symptom of the particular disease or condition, even if the underlying pathophysiology is not affected, such as treating the pain of a subject by administration of an analgesic agent even though such agent does not treat the cause of the pain.

The term "targeting moiety" as used herein refers to a moiety that localizes to or away from a specific locale. The moiety may be, for example, a protein, nucleic acid, nucleic acid analog, carbohydrate, or small molecule. Said entity may be, for example, a therapeutic compound such as a small molecule, or a diagnostic entity such as a detectable label. Said locale may be a tissue, a particular cell type, or a subcellular compartment. In one embodiment, the targeting moiety directs the localization of an active entity. The active entity may be a small molecule, protein, polymer, or metal. The active entity may be useful for therapeutic, prophylactic, or diagnostic purposes.

The phrase "pharmaceutically acceptable" refers to compositions, polymers and other materials and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically acceptable carrier" refers to pharmaceutically acceptable materials, compositions or vehicles, such as a liquid or solid filler, diluent, solvent or encapsulating material involved in carrying or transporting any subject composition, from one organ, or portion of the body, to another organ, or portion of the body. Each carrier must be "acceptable" in the sense of being compatible with the other ingredients of a subject composition and not injurious to the patient.

The term "pharmaceutically acceptable salts" is art-recognized, and includes relatively non-toxic, inorganic and organic acid addition salts of compounds. Examples of pharmaceutically acceptable salts include those derived from mineral acids, such as hydrochloric acid and sulfuric acid, and those derived from organic acids, such as ethanesulfonic acid, benzenesulfonic acid, and p-toluenesulfonic acid. Examples of suitable inorganic bases for the formation of salts include the hydroxides, carbonates, and bicarbonates of ammonia, sodium, lithium, potassium, calcium, magnesium, aluminum, and zinc. Salts may also be formed with suitable organic bases, including those that are non-toxic and strong enough to form such salts. For purposes of illustration, the class of such organic bases may include mono-, di-, and trialkylamines, such as methylamine, dimethylamine, and triethylamine; mono-, di- or trihydroxyalkylamines such as mono-, di-, and triethanolamine; amino acids, such as arginine and lysine; guanidine; N-methylglucosamine; N-methylglucamine; L-glutamine; N-methylpiperazine; morpholine; ethylenediamine; N-benzylphenethylamine;

The term "prolonged residence time" as used herein refers to an increase in the time required for an agent to be cleared from a patient's body, or organ or tissue of that patient. In certain embodiments, "prolonged residence time" refers to an agent that is cleared with a half-life that is 10%, 20%, 50% or 75% longer than a standard of comparison such as a comparable agent without a mucus-resistant coating. In certain embodiments, "prolonged residence time" refers to an agent that is cleared with a half-life of 2, 5, 10, 20, 50, 100, 200, 500, 1000, 2000, 5000, or 10000 times longer than a standard of comparison such as a comparable agent without a coating the promotes diffusion through the pores of the ECS of the brain.

The term "therapeutically effective amount" refers to an amount of the therapeutic agent that, when incorporated into and/or onto particles described herein, produces some desired effect at a reasonable benefit/risk ratio applicable to any medical treatment. The effective amount may vary depending on such factors as the disease or condition being treated, the particular targeted constructs being administered, the size of the subject, or the severity of the disease or condition. One of ordinary skill in the art may empirically determine the effective amount of a particular compound without necessitating undue experimentation. In some embodiments, the term "effective amount" refers to an amount of a therapeutic agent or prophylactic agent to reduce or diminish the symptoms of one or more diseases or disorders of the brain, such as reducing tumor size (e.g., tumor volume) or reducing or diminishing one or more symptoms of a neurological disorder, such as memory or learning deficit, tremors or shakes, etc. In still other embodiments, an "effective amount" refers to the amount of a therapeutic agent necessary to repair damaged neurons and/or induce regeneration of neurons.

The terms "incorporated" and "encapsulated" refers to incorporating, formulating, or otherwise including an active agent into and/or onto a composition that allows for release, such as sustained release, of such agent in the desired application. The terms contemplate any manner by which a therapeutic agent or other material is incorporated into a polymer matrix, including for example: attached to a monomer of such polymer (by covalent, ionic, or other binding interaction), physical admixture, enveloping the agent in a coating layer of polymer, and having such monomer be part of the polymerization to give a polymeric formulation, distributed throughout the polymeric matrix, appended to the surface of the polymeric matrix (by covalent or other binding interactions), encapsulated inside the polymeric matrix, etc. The term "co-incorporation" or "co-encapsulation" refers to-the incorporation of a therapeutic agent or other material and at least one other therapeutic agent or other material in a subject composition.

More specifically, the physical form in which any therapeutic agent or other material is encapsulated in polymers may vary with the particular embodiment. For example, a therapeutic agent or other material may be first encapsulated in a microsphere and then combined with the polymer in such a way that at least a portion of the microsphere structure is maintained. Alternatively, a therapeutic agent or other material may be sufficiently immiscible in the polymer that it is dispersed as small droplets, rather than being dissolved, in the polymer.

II. Compositions

Non-adhesive, brain-permeable particles suitable for delivering one or more active agent, particularly one or more active agents to prevent, treat or diagnose one or more diseases or disorders of the brain are described. These non-adhesive, brain-permeable nanoparticles with a diameter as large as 200 nm can diffuse rapidly in the brain ECS, preferably having neutral surface charge. In preferred embodiments, these particles are made up entirely of Generally Recognized As Safe (GRAS) materials. Synthetic particles composed entirely of GRAS materials will facilitate rapid translation of nanomaterials-based products into humans for the treatment of numerous diseases and conditions that affect the brain. As discussed in the examples below, exemplary particles include poly(lactic-co-glycolic acid) (PLGA) particles coated with triblock copolymers of polyethylene oxide-polypropylene oxide-polyethylene oxide (PEO-PPO-PEO).

A. Particles

1. Size

The ability of larger particles to diffuse into tissues holds many important implications for nanoparticle-based drug delivery and diagnostic systems. First, large particles have an enormous advantage over smaller particles for delivering drugs or diagnostic agents to tissues. This is not only because theoretical drug payload per particle increases with particle radius to the third power, but also because the ability to encapsulate a wide variety of therapeutics is significantly improved with the greater particle volume. By increasing particle size from 30 nm (expected to be capable of diffusing within ECS) to 100 nm (not previously expected to be capable), one can achieve more than 1000-fold higher drug loading per particle. Another advantage is that it is very difficult to attain slow release kinetics of molecules entrapped in small particles, whereas it is relatively straightforward to do so with larger particles. Taken together, these results show that the increased particle size described here should have significant impact on the ability to use nano-sized carriers for delivery of diagnostic and therapeutic agents in the brain.

In some embodiments, the particles have an average diameter greater than the pores in the extracellular space (ECS) of the brain. The brain ECS was found to have pores as large as 300 nm, with a high percentage having pores larger than 100 nm. In particular embodiments, the particles have an average diameter up 230 nm, preferably from about 60 to about 200 nm, more preferably from about 110 to about 200 nm as measured using dynamic light scattering. In another embodiment, the particles have a diameter from about 110 to about 230 nm, such as about 110, 120, 130, 140, 150, 160, 170, 180, 190, 200, 210, or 220 nm. The ranges above are inclusive of all values between the minimum and maximum values.

In another embodiment, the particles have an average diameter such that a majority of the particles do not become localized within cells or microdomains within tissue compared to larger particles. In particular embodiment, the particles have a diameter greater than 60 nm, particularly greater than 80 nm or greater than 100 nm and preferably less than 250 nm, more preferably less than 230 nm. The particles may have a size less than 60 nm provided the coating(s) resulting in enhanced penetration of a higher percentage of the particles.

2. Core Polymer

Any number of biocompatible polymers can be used to prepare the nanoparticles. In one embodiment, the biocompatible polymer(s) is biodegradable. In some embodiments, the core polymer is a hydrophobic polymer. Exemplary polymers include, but are not limited to, polyhydroxy acids and copolymers thereof such as poly(lactic acid) (PLA), poly(L-lactic acid) (PLLA), poly(glycolic acid) (PGA), poly(lactic acid-co-glycolic acid) (PLGA), poly(L-lactic acid-co-glycolic acid) (PLLGA), poly(D,L-lactide) (PDLA), poly(D,L-lactide-co-caprolactone), poly(D,L-lactide-co-caprolactone-co-glycolide), poly(D,L-lactide-co-PEO-co-D,L-lactide), poly(D,L-lactide-co-PPO-co-D,L-lactide), polyanhydrides, polyorthoesters, The carboxyl termini of carboxylic acid contain polymers, such as lactide- and glycolide-containing polymers, may optionally be capped, e.g., by esterification, and the hydroxyl termini may optionally be capped, e.g. by etherification or esterification. Copolymers of two or more polymers described above, including block and/or random copolymers, may also be employed to make the polymeric particles.

Copolymers of polyethylene glycol (or polyethylene oxide) "PEG" or copolymers or derivatives thereof may be incorporated on or with any of the polymers described above to make the polymeric particles. In certain embodiments, the PEG or derivatives may locate in the interior positions of the copolymer. Alternatively, the PEG or derivatives may locate near or at the terminal positions of the copolymer. In certain embodiments, the microparticles or nanoparticles are formed under conditions that allow regions of PEG to phase separate or otherwise locate to the surface of the particles. The surface-localized PEG regions alone may perform the function of, or include, a surface-altering agent.

3. Coatings

The nanoparticles preferably are coated with one or more materials (e.g., surface altering agents) that promote diffusion of the particles through the ECS in the brain by reducing interactions between the particles and brain tissue (e.g., reduce adhesion). Examples of the surface-altering agents include, but are not limited to, anionic proteins (e.g., albumin), surfactants (e.g. polyvinyl alcohol), sugars or sugar derivatives (e.g., cyclodextrin), and polymers.

Certain agents such as cyclodextrin may form inclusion complexes with other molecules and can be used to form attachments to additional moieties and facilitate the functionalization of the particle surface and/or the attached molecules or moieties.

Examples of surfactants include, but are not limited to, L-α-phosphatidylcholine (PC), 1,2-dipalmitoylphosphatidycholine (DPPC), oleic acid, sorbitan trioleate, sorbitan mono-oleate, sorbitan monolaurate, polyoxyethylene (20) sorbitan monolaurate, polyoxyethylene (20) sorbitan monooleate, natural lecithin, oleyl polyoxyethylene (2) ether, stearyl polyoxyethylene (2) ether, lauryl polyoxyethylene (4) ether, block copolymers of oxyethylene and oxypropylene, synthetic lecithin, diethylene glycol dioleate, tetrahydrofurfuryl oleate, ethyl oleate, isopropyl myristate, glyceryl monooleate, glyceryl monostearate, glyceryl monoricinoleate, cetyl alcohol, stearyl alcohol, polyethylene glycol 400, cetyl pyridinium chloride, benzalkonium chloride, olive oil, glyceryl monolaurate, corn oil, cotton seed oil, and sunflower seed oil, lecithin, oleic acid, and sorbitan trioleate.

Preferred polymers are generally recognized as safe (GRAS) materials including polyethylene glycol ("PEG"), PEG-containing polymers, and triblock copolymers of polyethylene oxide-polypropylene oxide-polyethylene oxide (PEO-PPO-PEO). The most preferred coating material is triblock copolymers of polyethylene oxide-polypropylene oxide-polyethylene oxide (PEO-PPO-PEO) or poloxamers, also known by the trade name PLURONICs®. Non-limiting examples of poloxamers include PLURONIC® L31, PLURONIC® L35, PLURONIC® L44, PLURONIC® L81, PLURONIC® L101, PLURONIC® L121, PLURONIC® P65, PLURONIC® PI03, PLURONIC® PI05, PLURONIC® PI23, PLURONIC® F38, PLURONIC® F68, PLURONIC® F87, PLURONIC® F108, PLURONIC® F98, PLURONIC® F127. The polymer referred to by the BASF trade name PLURONIC F127, is called poloxamer 407, and is a hydrophilic non-ionic surfactant of the more general class of copolymers known as poloxamers. Poloxamer 407 is a triblock copolymer consisting of a central hydrophobic block of polypropylene glycol flanked by two hydrophilic blocks of polyethylene glycol (PEG). The approximate lengths of the two PEG blocks is 101 repeat units while the approxitriate length of the propylene glycol block is 56 repeat units. In one embodiment, the particles are coated with polyethylene glycol (PEG). Poly(ethylene glycol) may be employed to reduce adhesion in brain ECS in certain configurations, e.g., wherein the length of PEG chains extending from the surface is controlled (such that long, unbranched chains that interpenetrate into the ECS are reduced or eliminated). For example, linear high MW PEG may be employed in the preparation of particles such that only portions of the linear strands extend from the surface of the particles (e.g., portions equivalent in length to lower MW PEG molecules). Alternatively, branched high MW PEG may be employed. In such embodiments, although the molecular weight of a PEG molecule may be high, the linear length of any individual strand of the molecule that extends from the surface of a particle would correspond to a linear chain of a lower MW PEG molecule.

The density of the coating can be varied based on a variety of factors including the surface altering material and the composition of the particle. In one embodiment, the density of the surface altering material is at least 0.001, 0.002, 0.005, 0.008, 0.01, 0.02, 0.05, 0.08, 0.1, 0.2, 0.5, 0.8, 1, 2, 5, 8, 10, 15, 20, 25, 40, 50, 60, 75, 80, 90, or 100 units per $nm^2$. The range above is inclusive of all values from 0.001 to 100 units per $nm^2$.

In another embodiment, the amount of the surface-altering moiety is expressed as a percentage of the mass of the particle. In a particular embodiment, the mass of the surface-altering moiety is at least $1/10,000$, $1/7500$, $1/5000$, $1/4000$, $1/3400$, $1/2500$, $1/2000$, $1/1500$, $1/1000$, $1/750$, $1/500$, $1/250$, $1/200$, $1/150$, $1/100$, $1/75$, $1/50$, $1/25$, $1/20$, $1/5$, $1/2$, or $9/10$ of the mass of the particle. The range above is inclusive of all vales from $1/10,000$ to $9/10$. In another embodiment, the weight percent of the surface altering material is at least 80%, 81%, 82%, 83%, 84%, 85%, 86%, 87%, 88%, 89%, 90%, 91%, 92%, 93%, 94%, 95%, or greater. The range above is inclusive of all values from 80% to 95%.

4. Particle Properties

As shown in the examples, the particles diffuse through the pores of the ECS of the brain at a greater rate of diffusivity than a reference particle, such as an uncoated particle, e.g., uncoated PLGA particle.

The particles described herein may pass through the pores of the ECS of the brain at a rate of diffusivity that is at least 10, 20, 25, 30, 40, 50, 60, 75, 80, 100, 125, 150, 175, 200, 250, 500, 600, 750, 1000, 1500, 2000, 2500, 3000, 4000, 5000, 7500, or 10000- or greater fold higher than a reference particle when measured in vitro. The range above is inclusive of all values from 10 to 10,000.

The transport rates of the particles can be measured using a variety of techniques in the art. In one embodiment, the rate of diffusion is measured by geometric ensemble mean squared displacements (MSD). In a particular embodiment, the particles may diffuse through the pores of the ECS of the brain with an MSD that is at least 5, 20, 30, 50, 60, 75, 80, 100, 125, 150, 200, 250, 500, 600, 750, 1000, 1500, 1750, 2000, 2500, 3000, 4000, 5000, 10000- or greater fold higher than a reference particle. The range above is inclusive of all values from 5 to 10,000.

In other embodiments, the particles diffuse through the pores of the ECS of the brain at a rate approaching the rate of diffusivity at which the particles diffuse through water. In a particular embodiment, the rate of diffusivity is at least $\frac{1}{10,000}$, $\frac{1}{7500}$, $\frac{1}{5000}$, $\frac{1}{1000}$, $\frac{1}{800}$, $\frac{1}{700}$, $\frac{1}{600}$, $\frac{1}{500}$, $\frac{1}{400}$, $\frac{1}{250}$, $\frac{1}{200}$, $\frac{1}{150}$, $\frac{1}{100}$, $\frac{1}{75}$, $\frac{1}{50}$, $\frac{1}{25}$, $\frac{1}{10}$, $\frac{1}{7}$, $\frac{1}{5}$, $\frac{1}{2}$, or 1 times the rate of diffusivity of the particle in water under identical conditions. The range above is inclusive of all values from $\frac{1}{10,000}$ to 1. For example, at a time scale of 1 s, the rates of diffusion of 40 nm, 100 nm, and 200 nm uncoated PLGA particles (i.e., unmodified or reference particles) were 76,000-fold, 16,000-fold, and 48,000-fold slower in brain tissue than the same particles in water. In contrast, at a time scale of 1s, PLURONIC®-coated particles exhibit 9-fold and 60-fold higher ensemble MSDs in water, respectively, compared with the corresponding uncoated PLGA particles of the same size.

The heterogeneity in particle transport rates can also be evaluated by examining the distribution of individual particle diffusivities at over a particular time period, e.g., 1s. Fast moving outlier particles are more likely to penetrate brain tissue and reach greater distances from the point of injection The particles can be classified based on their mode of transport: diffusive, hindered, or immobile. The τ-dependent {MSD} is fitted to the equation $\{MSD\}=4D_o\tau^\alpha$, where $D_o$ is the τ-dependent diffusivity and α is the anomalous diffusion exponent that reflects the extent of impediment. An α=1 represents unobstructed Brownian diffusion, such as particles in water, where a becomes smaller as obstruction to particle diffusion increases. Hindered particles have an α value closer to 0, where diffusive particles have an α value closer to 1. In the case where particles experience strong impediment due to interactions with components of the brain ECS, particles typically have an MSD below the microscope detection limit (e.g., 10 nm) and are classified as immobile. In one embodiment, at least 15%, 20%, 25%, 30%, 35%, 40%, 45%, 50%, 55%, 60%, 65%, 70%, 75%, 80%, or greater of coated particles of a given average particle size are classified as diffusive. The range of above is inclusive of all values from 15% to 80%.

The presence of the surface-altering agent can affect the zeta-potential of the particle. In one embodiment, the zeta potential of the particles is −100 mV and 10 mV, between −50 mV and 10 mV, between −25 mV and 10 mV, between −20 mV and 5 mV, between −10 mV and 10 mV, between −10 mV and 5 mV, between −5 mV and 5 mV, or between −2 mV and 2 mV. In a preferred embodiment, the surface charge is neutral or near-neutral. The range above is inclusive of all values from −100 mV to 10 mV.

B. Therapeutic, Diagnostic and Prophylactic Agents to be Delivered

The nanoparticles can be used to deliver one or more active agent, particularly one or more active agents to prevent or treat one or more diseases or disorders of the brain. Suitable active agents include therapeutic, diagnostic, and/or prophylactic agents. The agent can be a biomolecule, such as an enzyme, protein, polypeptide, or nucleic acid or a small molecule agent (e.g., molecular weight less than 2000 amu, preferably less than 1500 amu), including organic, inorganic, and organometallic agents. The agent can be encapsulated within the particles, dispersed within the particles, and/or associated with the surface of the particle, either covalently or non-covalently.

Therapeutic agents include chemotherapeutic agents, agents for treatment or alleviation of neurological diseases and disorders, anti-inflammatories, agents for treatment of brain trauma, antiinfectives, and combinations thereof.

Exemplary diagnostic materials include paramagnetic molecules, fluorescent compounds, magnetic molecules, and radionuclides. Suitable diagnostic agents include, but are not limited to, x-ray imaging agents and contrast media. Radionuclides also can be used as imaging agents. Examples of other suitable contrast agents include gases or gas emitting compounds, which are radioopaque. Nanoparticles can further include agents useful for determining the location of administered particles. Agents useful for this purpose include fluorescent tags, radionuclides and contrast agents.

For those embodiments where the one or more therapeutic, prophylactic, and/or diagnostic agents are encapsulated within a polymeric nanoparticle and/or associated with the surface of the nanoparticle, the percent drug loading is from about 1% to about 80%, from about 1% to about 50%, preferably from about 1% to about 40% by weight, more preferably from about 1% to about 20% by weight, most preferably from about 1% to about 10% by weight. The ranges above are inclusive of all values from 1% to 80%. For those embodiments where the agent is associated with the surface of the particle, the percent loading may be higher since the amount of drug is not limited by the methods of encapsulation. In some embodiments, the agent to be delivered may be encapsulated within a nanoparticle and associated with the surface of the particle.

C. Pharmaceutical Excipients for Delivery to the Brain

The particles may be administered in combination with a physiologically or pharmaceutically acceptable carrier, excipient, or stabilizer. The term "pharmaceutically acceptable" means a non-toxic material that does not interfere with the effectiveness of the biological activity of the active ingredients. The term "carrier" refers to an organic or inorganic ingredient, natural or synthetic, with which the active ingredient is combined to facilitate the application.

Pharmaceutical compositions may be formulated in a conventional manner using one or more physiologically acceptable carriers including excipients and auxiliaries which facilitate processing of the active compounds into preparations which can be used pharmaceutically. Proper formulation is dependent upon the route of administration chosen. In preferred embodiments, the particles are formulated for parenteral delivery to the brain. Typically the particles will be formulated in sterile saline or buffered solution for injection into the tissues or cells to be treated. The particles can be stored lyophilized in single use vials for rehydration immediately before use. Other means for rehydration and administration are known to those skilled in the art.

Optional pharmaceutically acceptable excipients include, but are not limited to, lubricants, disintegrants, colorants, stabilizers, and surfactants.

Stabilizers are used to inhibit or retard decomposition reactions which include, by way of example, oxidative reactions.

The nanoparticles or nanoconjugates are preferably formulated in dosage unit form for ease of administration and uniformity of dosage. The expression "dosage unit form" as used herein refers to a physically discrete unit of conjugate appropriate for the patient to be treated. It will be understood, however, that the total daily usage of the compositions will be decided by the attending physician within the scope of sound medical judgment. For any nanoparticle or nanoconjugate, the therapeutically effective dose can be estimated initially either in cell culture assays or in animal models, usually mice, rabbits, dogs, or pigs. The animal model is also used to achieve a desirable concentration range and route of administration. Such information can then be used to determine useful doses and routes for administration in humans. Therapeutic efficacy and toxicity of conjugates can be determined by standard pharmaceutical procedures in cell cultures or experimental animals, e.g., ED50 (the dose is therapeutically effective in 50% of the population) and LD50 (the dose is lethal to 50% of the population). The dose ratio of toxic to therapeutic effects is the therapeutic index and it can be expressed as the ratio, LD50/ED50. Pharmaceutical compositions which exhibit large therapeutic indices are preferred. The data obtained from cell culture assays and animal studies can be used in formulating a range of dosages for human use.

III. Pharmaceutical Formulations

Pharmaceutical formulations contain one or more polymeric nanoparticles in combination with one or more pharmaceutically acceptable excipients. Representative excipients include solvents, diluents, pH modifying agents, preservatives, antioxidants, suspending agents, wetting agents, viscosity modifiers, tonicity agents, stabilizing agents, and combinations thereof. Suitable pharmaceutically acceptable excipients are preferably selected from materials which are generally recognized as safe (GRAS), and may be administered to an individual without causing undesirable biological side effects or unwanted interactions.

Generally, pharmaceutically acceptable salts can be prepared by reaction of the free acid or base forms of an active agent with a stoichiometric amount of the appropriate base or acid in water or in an organic solvent, or in a mixture of the two; generally, non-aqueous media like ether, ethyl acetate, ethanol, isopropanol, or acetonitrile are preferred. Pharmaceutically acceptable salts include salts of an active agent derived from inorganic acids, organic acids, alkali metal salts, and alkaline earth metal salts as well as salts formed by reaction of the drug with a suitable organic ligand (e.g., quaternary ammonium salts). Lists of suitable salts are found, for example, in Remington's Pharmaceutical Sciences, 20th ed., Lippincott Williams & Wilkins, Baltimore, MD, 2000, p. 704. Examples of ophthalmic drugs sometimes administered in the form of a pharmaceutically acceptable salt include timolol maleate, brimonidine tartrate, and sodium diclofenac.

In some cases, the active agent is a diagnostic agent imaging or otherwise assessing the diseases or conditions of the brain such as brain tumors. Exemplary diagnostic agents include paramagnetic molecules, fluorescent compounds, magnetic molecules, and radionuclides, x-ray imaging agents, and contrast media.

In certain embodiments, the pharmaceutical composition contains one or more local anesthetics. Representative local anesthetics include tetracaine, lidocaine, amethocaine, proparacaine, lignocaine, and bupivacaine. In some cases, one or more additional agents, such as a hyaluronidase enzyme, is also added to the formulation to accelerate and improves dispersal of the local anesthetic.

A. Formulations for Administration to the Brain

The polymeric nanoparticles will preferably be formulated as a suspension for injection to the brain such as via intracranial administration. In preferred embodiments, the polymeric nanoparticles will preferably be formulated suitable for intracranial injection by convection enhanced delivery (CED).

Pharmaceutical formulations for administration to the brain are preferably in the form of a sterile aqueous suspension of nanoparticles. Acceptable solvents include, for example, water, Ringer's solution, phosphate buffered saline (PBS), and isotonic sodium chloride solution. The formulation may also be a sterile solution, suspension, or emulsion in a nontoxic, parenterally acceptable diluent or solvent such as 1,3-butanediol.

In some instances, the formulation is distributed or packaged in a liquid form. Alternatively, formulations for intracranial administration can be packed as a solid, obtained, for example by lyophilization of a suitable liquid formulation. The solid can be reconstituted with an appropriate carrier or diluent prior to administration.

Suspensions or emulsions for intracranial administration may be buffered with an effective amount of buffer necessary to maintain a pH suitable for intracranial administration. Suitable buffers are well known by those skilled in the art and some examples of useful buffers are acetate, borate, carbonate, citrate, and phosphate buffers.

Suspensions, or emulsions for intracranial administration may also contain one or more tonicity agents to adjust the isotonic range of the formulation. Suitable tonicity agents are well known in the art and some examples include glycerin, mannitol, sorbitol, sodium chloride, and other electrolytes.

Suspensions, or emulsions for intracranial administration may also contain one or more preservatives to prevent bacterial contamination. Suitable preservatives are known in the art, and include polyhexamethylenebiguanidine (PHMB), benzalkonium chloride (BAK), stabilized oxychloro complexes (otherwise known as Purite®), phenylmercuric acetate, chlorobutanol, sorbic acid, chlorhexidine, benzyl alcohol, parabens, thimerosal, and mixtures thereof.

Suspensions, or emulsions for intracranial administration may also contain one or more excipients known art, such as dispersing agents, wetting agents, and suspending agents.

IV. Methods of Manufacture

A. Particles

Nanoparticles can be made using a variety of techniques in the art. The technique to be used can depend on a variety of factors including the polymer used to form the microparticles and the desired size range of the resulting particles. The type of active agent to be incorporated into the particles may also be a factor as some agents are unstable in the presence of organic solvents and/or high temperatures.

The particles are preferably made using an emulsion technique. Methods for preparing particles include, but are not limited to:

a. Solvent Evaporation. In this method the polymer is dissolved in a volatile organic solvent, such as methylene chloride. The drug (either soluble or dispersed as fine particles) is added to the solution, and the mixture is suspended in an aqueous solution that contains a surface active agent such as poly(vinyl alcohol). The resulting emulsion is stirred until most of the organic solvent evaporated, leaving solid nanoparticles. The resulting nanoparticles are washed with water and dried overnight in a lyophilizer. Nanoparticles with different sizes and morphologies can be obtained by this method. This method is useful for relatively stable polymers like polyesters and polystyrene.

b. Solvent Removal. This technique is primarily designed for polyanhydrides. In this method, the drug is dispersed or dissolved in a solution of the selected polymer in a volatile organic solvent like methylene chloride. This mixture is suspended by stirring in an organic oil (such as silicon oil) to form an emulsion. Unlike solvent evaporation, this method can be used to make nanoparticles from polymers with high melting points and different molecular weights. The external morphology of spheres produced with this technique is highly dependent on the type of polymer used.

c. Spray-Drying. In this method, the polymer is dissolved in organic solvent. A known amount of the active drug is suspended (insoluble drugs) or co-dissolved (soluble drugs) in the polymer solution. The solution or the dispersion is then spray-dried.

d. Phase Inversion. Microspheres can be formed from polymers using a phase inversion method wherein a polymer is dissolved in a "good" solvent, fine particles of a substance to be incorporated, such as a drug, are mixed or dissolved in the polymer solution, and the mixture is poured into a strong non solvent for the polymer, to spontaneously produce, under favorable conditions, polymeric microspheres, wherein the polymer is either coated with the particles or the particles are dispersed in the polymer. The method can be used to produce nanoparticles in a wide range of sizes, including, for example, about 100 nanometers to about 10 microns. Exemplary polymers which can be used include polyvinylphenol and polylactic acid. Substances which can be incorporated include, for example, imaging agents such as fluorescent dyes, or biologically active molecules such as proteins or nucleic acids. In the process, the polymer is dissolved in an organic solvent and then contacted with a non solvent, which causes phase inversion of the dissolved polymer to form small spherical particles, with a narrow size distribution optionally incorporating an antigen or other substance.

B. Surface-Altering Coatings

The particles can be coated with the surface-altering agent using a variety of techniques known in the art depending on whether the coating is covalently or non-covalently associated with the particles. The material can be applied non-covalently, for example, by spray drying.

The coating can be covalently attached to the particles by reacting functional groups on the particles with reactive functional groups on the agent to be attached. For example, aminated PEG can be reacted with reactive functional groups on the particles, such as carboxylic acid groups, to covalently attach the agent via an amide bond. In other embodiments, a spacer molecule may be incorporated between the particle surface and the surface-altering agent.

In preferred embodiments, the surface-altering agents are non-covalently associated with the particles.

V. Methods of Use

The particle formulations can be used to administer one or more therapeutic, prophylactic, and/or diagnostic agents directly to the brain to treat one or more diseases or disorders of the brain.

A. Disorders or Diseases to be Treated

In general, these encompass any disease requiring treatments or diagnostic approaches wherein the effect of the active agent(s) would be improved by enhanced tissue penetration, cellular or structural targeting, concomitant delivery, and/or sustained-release, particularly in the brain.

Exemplary diseases and disorders of the brain include, but are not limited to, neoplasms (e.g., cancers, tumors, growths); infections (e.g., HIV/AIDS, Tuberculosis); inflammation (e.g., multiple sclerosis, transverse myelitis and other autoimmune processes, cerebral or tissue edema and other reactive processes); acquired or degenerative conditions (Alzheimer's disease, Parkinson's disease, Stroke, Amylotrophic Lateral Sclerosis, Acute and Chronic Traumatic and Pain syndromes); congenital or genetic abnormalities (e.g., Neurofibromatosis, Mucopolysaccaridoses, Tuberous Sclerosis, Von Hippel Lindau); epigenetic conditions, and brain trauma or injury, such as battlefield injuries.

B. Methods of Administration and Dosing

The nanoparticle formulations can be administered using a variety of routes of administration. In some embodiments, the nanoparticle compositions are administered locally to the site/tissue of interest, for example, via direct administration to the brain. Enhanced local delivery can be achieved via convection, electromagnetic, or other forces.

Other modes of administration include intrathecal or intra-ventricular delivery via cerebro-spinal fluid spaces; intra-nasal administration or delivery via the olfactory bulb; and systemic delivery via oral, intravenous, or intra-arterial administration.

Enhanced systemic delivery via co- or sequential administration with permeabilization agents including but not limited to chemical agents, pharmacologic substances (e.g. cytokines), mechanical barrier disruption (e.g. ultrasound, electron paramagnetic resonance (EPR), ultrasound plus microbubbles), and/or osmotic changes (e.g. mannitol), In general the timing and frequency of administration will be adjusted to balance the efficacy of a given treatment or diagnostic schedule with the side-effects of the given delivery system. Exemplary dosing frequencies include, but are not limited to, continuous infusion, single and multiple administrations, hourly, daily, weekly, monthly, or yearly dosing.

In preferred embodiments, local delivery into the brain parenchyma is used for enhanced penetration of bioactive or imaging agents in the brain.

Additional factors need to be taken into consideration for optimal delivery of the nanoparticle compositions, for example concentration and osmolality. As described in the examples below, osmolality can affect the distribution. In some embodiments, the osmolality for administration to the brain is between about 50 mOsm/kg, 100 mOsm/kg, 200 mOsm/kg, 300 mOsm/kg, and about 400 mOsm/kg, 500 mOsm/kg, 600 mOsm/kg, 700 mOsm/kg, 800 mOsm/kg, 900 mOsm/kg, or 1000 mOsm/kg; about 200 mOsm/kg to about 600 mOsm/kg, preferably 300 mOsm/kg to 1000 mOsm/kg. The nanoparticles are formulation with an osmolality between about 300 mOsm/kg and about 1000 mOsm/kg, preferably between about 400 mOsm/kg and about 800 mOsm/kg, effective to increase volumetric distribution of the nanoparticles at the site of administration in the brain relative to an equivalent formulation with an osmolality of less than 50 mOsm/kg, or 80 mOsm/kg, or 300 mOsm/kg. In preferred embodiments, hyper-osmolar formulations are used to enhance locally administered nanoparticles in brain parenchyma and/or perivascular space. Synergistic improvement of therapeutic distribution enabled by these non-adhesive, brain-permeable nanoparticles and osmosis-driven brain extracellular matrix (ECM) modulation will significantly enhance drug and gene delivery within the CNS, offering higher drug payload, improved drug loading efficiency, and significantly longer drug release durations.

The present invention will be further understood by reference to the following non-limiting examples.

EXAMPLES

Example 1: Physicochemical Characterization of PLGA NPs

Surfactants are frequently used to stabilize particle emulsions, enhance drug loading, alter drug release, and change surface properties. As early as 1994, it was demonstrated that nanospheres, synthesized from amphiphilic copolymers composed of two biocompatible blocks (including PEG), exhibit dramatically increased blood circulation times and low liver accumulation in mice. Several PEG-containing block copolymers were then developed and among them, the amphiphilic and polymeric characters of Pluronic® block copolymers such as poloxamer 188 (F68), poloxamer 288 (F98), and poloxamer 407 (F127) have raised growing interest for the design of drug delivery systems. F68 and F127 have been used to coat poly(lactic-co-glycolic acid) (PLGA) NPs to promote blood-brain barrier penetration. They have also been shown to improve efficacy against intracranial gliomas compared to uncoated particles. However, their effect on brain tissue penetration within the brain extracellular matrix (ECM) followed by convection-enhanced delivery (CED) is still unknown, particularly for F98, which has not received the same attention as F68 and F127 in scientific literature.

Pluronic-coated biodegradable NPs present a potential drug delivery platform that could enhance treatments against diffusive brain diseases, particularly, infiltrative glioblastomas, by providing greater brain tissue penetration and broader therapeutic distribution in a safely manner. To this end, the impact of three Pluronic candidates (F68, F98, and F127) was studied in relationship to their physicochemical properties favoring brain penetration followed by CED, using concepts and optimized procedures discussed in previous chapters. PLGA was used since it is one of the most successfully developed biodegradable polymers for protection of drug from degradation, sustained release, and possibility to modify surface properties to provide stealthness and/or better interaction with biological materials. The volumetric distribution of the three types of Pluronic-coated PLGA NPs was then compared in relationship to their size and charge, to select the lead NP formulation for further CED optimization and tumor studies.

Methods

PLGA Labeling with a Fluorescence Dye

PLGA polymer (carboxyl terminated, 50:50 monomer ratio) (Resomer RG 503-H, MW: 30,500) was purchased from Evonik Industries (Darmstadt, Germany) and conjugated with fluorescein cadaverine dye ($\lambda Ex/\lambda Em$: 493/517 nm) (Biotium, Fremont, CA). The reaction was carried out by carbodiimide conjugation, activating carboxyl groups from PLGA for direct reaction with the primary amine via amide bond formation. Briefly, PLGA polymer was dissolved in dimethylformamide (DMF) and activated by N', N-di-cyclohexyl carbodiimide (DCC) and N-hydroxysulfo-succinimide (NHS). The reaction was carried out for 3 hours under constant stirring at room temperature and controlled vacuum with inert $N_2$ gas. Then, pH was adjusted to 7.5 and the fluorescein cadaverine dye was dissolved in DMF and added immediately to the activated polymer solution to react at a polymer:dye molar ratio of 1:1.2, respectively. This reaction was carried out overnight under constant stirring at room temperature and protected from light. Next, DMF was added to dissolve the precipitates and the solution was filtered by gravity using a Pasteur pipette. Then, the solution was dialyzed for 3 hours against DMF using a Spectra/Por® 6 Standard RC 1 kD dialysis membrane (Spectrum Laboratories, Inc., Rancho Dominguez, CA). Lastly, DMF was evaporated using a Biotage® V-10 Touch evaporation system (Biotage, Charlotte, NC) and dye conjugation was confirmed by nuclear magnetic resonance (NMR) analysis.

Nanoparticle Formulation in Ultrapure Water

Organic solvents used for preparing polymer solution are known to affect the size of PLGA NPs synthesized through emulsion procedures. Partially water-miscible organic solvents—such as benzyl alcohol, butyl lactate, and ethyl acetate—allow nanoparticle formulation through an emulsion-diffusion mechanism and can produce smaller nanoparticles than water-immiscible solvents such as dichloromethane (DCM). Furthermore, Saltzman et al. reported that replacing DCM with ethyl acetate and using the double-emulsion technique improved the yield of small nanoparticles (<100 nm in diameter).

This protocol was adapted to formulate uncoated PLGA NPs by single-emulsion method. Briefly, fluorescently labeled PLGA polymer was dissolved in acetonitrile (ACN) at 30 mg/ml and 500 µL of the polymer solution was added dropwise into 2 mL of ultrapure water using an SGE syringe (Supelco Inc., Bellefonte, PA). The solution was stirred for 1 hour at room temperature for the primary emulsion, where nanoparticles were formed spontaneously. Then, the emulsion was poured into a beaker with 10 mL of ultrapure water to allow the secondary emulsion to form. This was followed by an additional 4 hours of stirring to allow the solvent to evaporate and particles to harden. After solvent evaporation, the particle solution was washed once with 1 volume of ultrapure water and collected using Amicon Ultra Centrifugal Filters (100,000 MWCO; Millipore Corp., Billerica, MA) at 4,000×g for 12 minutes until final volume in the filter unit was 500 µL.

Nanoparticle Formulation in F68, F98, and F127 Aqueous Solution

Similarly, fluorescently labeled PLGA polymer was dissolved in ACN at 30 mg/ml and 500 µL of the polymer solution was added dropwise into 2 mL of 1% F68, 1% F98, or 1% F127 aqueous solution, using an SGE syringe. The solution was stirred for 1 hour at room temperature for the primary emulsion, where nanoparticles were formed spontaneously. Then, the emulsion was poured into a beaker with 10 mL of 0.5% F68, 0.5% F98, or 0.5% F127 aqueous solution. This was followed by an additional 4 hours of stirring to allow the solvent to evaporate and particles to harden. After solvent evaporation, the particle solution was washed once with 1 volume of ultrapure water and collected using Amicon Ultra Centrifugal Filters (100,000 MWCO;

Millipore Corp., Billerica, MA) at 4,000×g for 12 minutes until final volume in the filter unit was 500 µL.

Particle diameter is directly proportional to the polymer concentration (29). Thus, the same protocol was used to formulate F127/PLGA-NPs of various sizes (~60 to 350 nm) by adjusting the PLGA starting concentration to 5, 10, 30, 50, 60, 80 mg/ml in ACN.

Physicochemical Characterization of PLGA NPs

The hydrodynamic diameters as well as PDI and ζ-potentials of uncoated and Pluronic-coated PLGA NPs were measured by DLS and laser Doppler anemometry in 10 mM NaCl solution at pH 7.0, using a Nanosizer ZS90 (Malvern Instruments, Southborough, MA). The size and morphology of nanoparticles were also confirmed by TEM (Hitachi H7600, Japan). Colloidal stability was assessed by monitoring the change in hydrodynamic diameters and PDI in aCSF (Harvard Apparatus, Holliston, MA) at 37° C.

Statistical Analysis

Statistical analysis between two groups was conducted using a two-tailed Student's t-test assuming unequal variances. If multiple comparisons were involved, one-way analysis of variance (ANOVA), followed by Sidak's multiple comparisons test, was employed, using GraphPad Software (GraphPad Software Inc., La Jolla, CA). Differences were determined to be statistically significant at $p<0.05$. Values are presented as mean±standard error of the mean (SEM).

Results

Figure 1B:
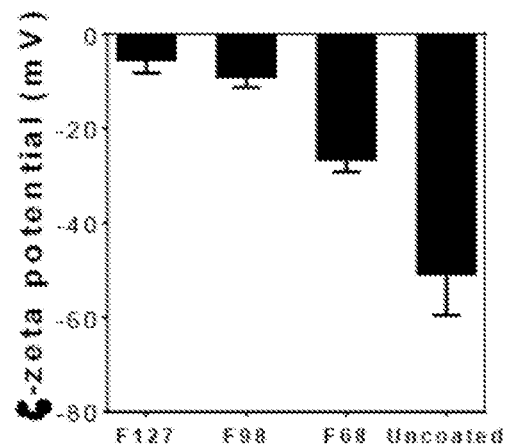

Pluronic-coated PLGA NPs were formulated by single-emulsion method, mixing the organic PLGA solution into various aqueous Pluronic solutions, F68, F98, and F127. The uncoated PLGA NPs were formed in ultrapure water as a negative control. Hydrodynamic diameter and polydispersity index (PDI) were measured by dynamic light scattering (DLS) in 10 mM NaCl. The ζ-potential was measured by laser Doppler anemometry in 10 mM NaCl at pH 7.0. At least 3 independent experiments were performed for this analysis. FIG. 1A shows the hydrodynamic diameters of these PLGA NPs. Table 1 shows that all Pluronic-coated PLGA NPs possessed a hydrodynamic diameter of ~130 nm and a low PDI~0.1, whereas uncoated PLGA NPs possessed a slightly larger hydrodynamic diameter of ~140 nm and higher PDI of ~0.18. On the other hand, the surface charge showed a trend from highly negative to near neutral, as indicated by the ζ-potential, in the following order: uncoated >F68>F98>F127: −50±9, −26±3, −9±3, −4±3 mV, respectively (FIG. 1B). The particle morphology was confirmed by transmission electron microscopy (TEM) to be ~150 nm spheres regardless of type of coating, consistent with the measured hydrodynamic diameters (Table 1).

TABLE 1

Physicochemical properties of PLGA NPs with various Pluronic

| | Z-Average ± SEM (nm)[a] | Number mean ± SEM (nm)[a] | PDI[a] | ζ-Potential ± SEM (mV)[b] |
|---|---|---|---|---|
| Uncoated | 180 ± 8 | 140 ± 6 | 0.18 | −50 ± 9 |
| F68 | 158 ± 2 | 126 ± 3 | 0.09 | −26 ± 3 |
| F98 | 162 ± 5 | 128 ± 4 | 0.12 | −9 ± 3 |
| F127 | 161 ± 1 | 134 ± 3 | 0.07 | −4 ± 3 |

[a]Hydrodynamic diameter and polydispersity index (PDI) were measured by dynamic light scattering (DLS) in 10 mM NaCl at pH 7.0. Mean ± SEM (n ≥ 3).
[b]ζ-potential was measured by laser Doppler anemometry in 10 mM NaCl at pH 7.0. Mean ± SEM (n ≥ 3).

Figure 1C:
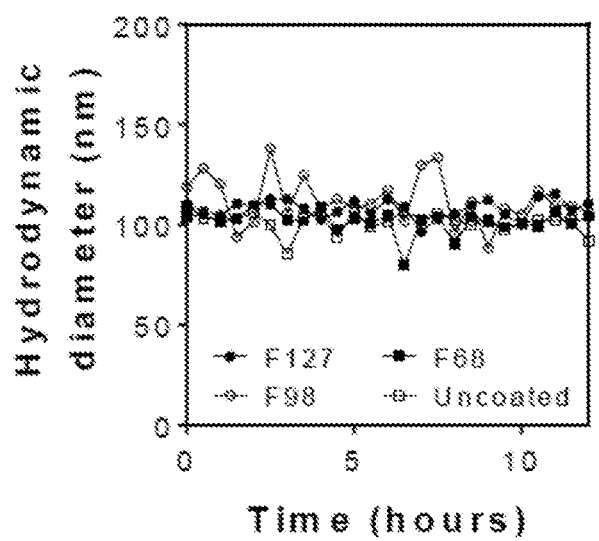
FIG. 1C is a line graph showing colloidal stability (hydrodynamic diameter, nm) of uncoated NPs or coated NPs with Pluronic solutions, F68, F98, and F127 over a period of 12 hours in artificial cerebrospinal fluid (aCSF) at 37° C.

The hydrodynamic diameters of the various PLGA NPs were assessed following a 12-hour incubation in artificial cerebrospinal fluid (aCSF) at 37° C. to predict potential alteration of particle properties in the physiological brain environment. All formulations retained their hydrodynamic diameters and PDI in aCSF over time. Notably, F98 showed less colloidal stability than the other groups, but even with the drastic and sudden changes, it retained the diameter in similar range as the other PLGA NPs (FIG. 1C).

Example 2: Volume of Distribution in Healthy Rat Brains

Methods

Animal Studies 6-to-8-week-old female Fischer 344 rats were used for the assessment of the volume of distribution of the various PLGA NPs. Animals were treated in accordance with the guidelines and policies of the Johns Hopkins University Animal Care and Use Committee. Surgical procedures were performed using standard sterile surgical techniques. Animals were anesthetized using a mixture of 75 mg/kg ketamine and 7.5 mg/kg xylazine. A midline scalp incision was made to expose the coronal and sagittal sutures and a burr whole was drilled 3 mm lateral to the sagittal suture and 0.5 mm posterior to the bregma. Following the tumor cell inoculation or PLGA NPs administration, the skin was sealed using biodegradable sutures (Polysorb™ Braided Absorbable Sutures 5-0) and bacitracin was applied.

Intracranial Administration—CED

To assess the volume of distribution of the various PLGA NPs, fluorescently labeled NPs were intracranially administered via CED. Briefly, a Neuros syringe connected to a 33-gauge needle was filled with 20 µL of PLGA NPs solution at a polymer concentration of 15 mg/mL and lowered to a depth of 3.5 or 2.5 mm of a healthy or an orthotopic tumor-bearing rat brain, targeting the striatum or the tumor core, respectively. PLGA NPs were then infused at a rate of 0.5 µL/min as controlled by a Chemyx Nanojet Injector Module (Chemyx, Stafford, TX).

Imaging and Quantification of Volumetric of Distribution

Brains were harvested immediately after PLGA NPs administration and flash-frozen in dry-ice. Tissues were then sectioned using a Leica CM 1905 cryostat into 100 or 50 µm coronal slices for healthy or tumor-bearing rats at ±3 mm of the infusion plane in striatum or until the tumor tissue was no longer visible, respectively. All fluorescence images were taken using an LSM 710 confocal microscope under 5× magnification. The settings were optimized to avoid background fluorescence based on the microscopy of untreated control rat brains. The volume of distribution was quantified using a custom-made MATLAB script that subtracted background fluorescence by Otsu's method of thresholding. The area of PLGA NPs coverage in each slice was integrated to calculate the total volume of distribution.

To reconstruct 3D-rendered imaginings of F127/PLGA-NPs distribution in orthotopic tumor, we stacked and aligned the acquired images using Metamorph® Microscopy Automation & Image Analysis Software (Molecular Devices, CA). Imaris Software (Bitplane, CT) was used to create 3D isosurfaces.

Results

Figure 2A:
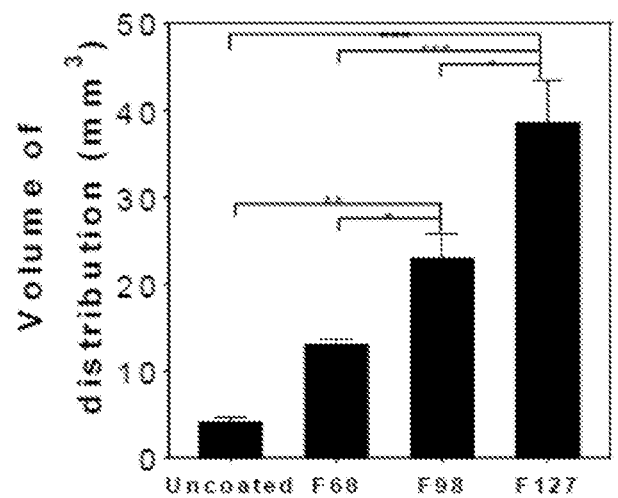
FIGS. 2A and 2B are bar graphs showing volume of distribution obtained by confocal microscopy immediately after NPs treatment mediated by CED of uncoated NPs or coated NPs with Pluronic solutions, F68, F98, and F127 administered into the rats striatum via CED in healthy rat brains immediately after NPs-treatment. n≥4 rats. Differences are statistically significant as indicated (*p<0.05, p<0.01 *P<0.001) (FIG. 2A) and showing quantification of the volume of distribution of PLGA NPs (mm$^3$) (n≥4 rats). Differences are statistically significant as indicated (*p<0.05, p<0.01 *p<0.001) (FIG. 2B).

The various PLGA NPs were administered into the rats' striatum via CED, which has been clinically applied to enhance the therapeutic distribution within brain by creating a continuous pressure-driven bulk flow. The volumetric distribution at the infusion site of PLGA NPs when uncoated and coated with F68, F98, F127 in healthy rat brains obtained by confocal microscopy immediately after the treatment was then assessed. Images showing the coronal plane at the site of administration revealed enhanced volumes of distribution for all Pluronic-coated PLGA NPs, whereas the uncoated control was confined around the needle track. The trend seen in the volume of distribution of PLGA NPs in rat brains was inversely correlated to their surface charge: F127>F98>F68>uncoated. Quantitatively, F127/PLGA-NPs exhibited significantly greater volumetric distribution compared to all the groups (FIG. 2A), with an average volumetric distribution of 38±5 mm³, 23±3 mm³, 13±0.7 mm³, 4±0.7 mm³, for F127, F98 ($p<0.05$), F68 ($p<0.001$), uncoated ($p<0.001$), respectively. Notably, F98/PLGA-NPs showed the second highest value for volume of distribution, exhibiting statistical significance when compared to F68 ($p<0.05$) and uncoated ($p<0.01$) NPs.

Figure 2B:
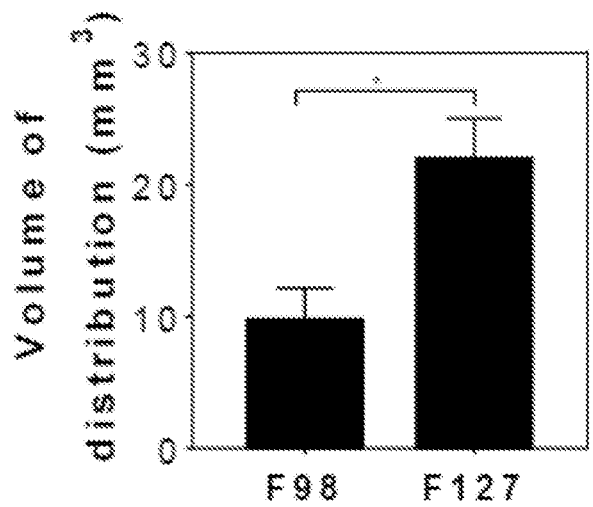

It was also confirmed that the two best Pluronic candidates, F98 and F127, were still present in the brain parenchyma 48 hours after NPs treatment, albeit, the volume of distribution decreased by ~2-fold when compared to the volume of distribution achieved immediately after CED. Quantitatively, F98 showed a volumetric distribution of 10±2 mm³, whereas F127 demonstrated significantly greater distribution than F98 by ~2-fold, with 22±3 mm³ ($p<0.05$) (FIG. 2B).

Example 3: Effect of Polymer Concentration on F127/PLGA-NPs

Results

Next, the effect of PLGA concentration on the physicochemical properties of the F127/PLGA-NPs was evaluated. The data of the various types of PLGA NPs was taken from batches at a starting polymer concentration of 30 mg/ml. This same protocol was then adjusted to formulate F127/PLGA-NPs of various sizes (~60 to 350 nm) by changing the PLGA starting concentration to 5, 10, 30, 50, 60, 80 mg/ml. Here, the batch of F127/PLGA-NPs at a starting concentration of 30 mg/ml was used as a control. The highest polymer concentration that provided consistent NPs yield, according to DLS, was 80 mg/ml; concentrations greater than that one did not allow successful recovery during the washing process due to significant polymer aggregation. See FIG. 3.

Figure 3:
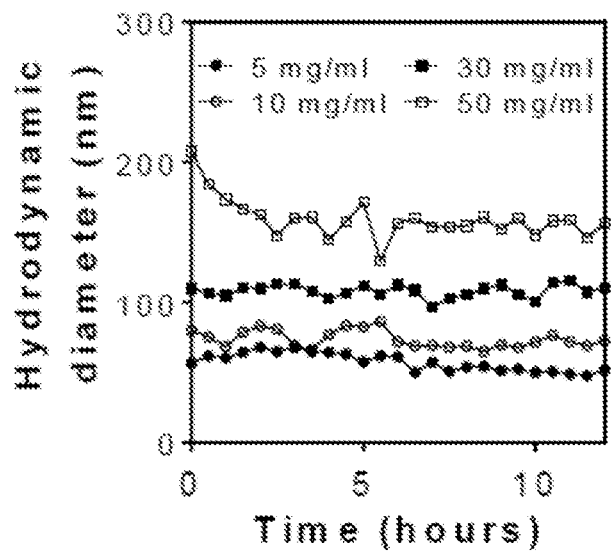
FIG. 3 is a graph of the hydrodynamic diameter (nm) over time (hours) for different concentrations of NPs: 5 (closed circle), 10 (open circle), 30 (closed square) and 50 (open square).

Table 2 shows a tendency consistent with the expected results, where increments of the starting PLGA concentration yielded larger diameters. Although the PDI was not significantly affected by the polymer concentration, the surface charge showed a "more negative" inclination as the PLGA concentration increased. Note, we named each condition based on the hydrodynamic diameter after the number mean reported by DLS. For example, "F127/PLGA-130" refers to the control batch of 30 mg/ml, which showed a hydrodynamic diameter of 135±5 nm. Lastly, the colloidal stability of the various F127/PLGA-NPs was assessed (only four are shown in FIG. 3) and confirmed that the hydrodynamic diameters did not change over time in physiological conditions.

TABLE 2

Effect of polymer concentration on physiochemical properties of

| F127/PLGA-NPs | Polymer concentration (mg/ml) | Z-Average ± SEM (nm)[a] | Number mean ± SEM (nm)[a] | PDI[a] | ζ-Potential ± SEM (mV)[b] |
|---|---|---|---|---|---|
| F127/PLGA-60  | 5  | 89 ± 2   | 63 ± 3   | 0.07 ± 0.05 | −1.6 ± 6.2 |
| F127/PLGA-100 | 10 | 111 ± 8  | 89 ± 8   | 0.08 ± 0.04 | −2.2 ± 5.8 |
| F127/PLGA-130 | 30 | 160 ± 7  | 135 ± 5  | 0.08 ± 0.03 | −3.5 ± 4.5 |
| F127/PLGA-170 | 50 | 198 ± 9  | 171 ± 13 | 0.10 ± 0.02 | −4.0 ± 4.2 |
| F127/PLGA-200 | 60 | 257 ± 1  | 198 ± 4  | 0.16 ± 0.02 | −4.6 ± 4.3 |
| F127/PLGA-350 | 80 | 387 ± 14 | 341 ± 36 | 0.10 ± 0.04 | −4.8 ± 4.1 |

[a]Hydrodynamic diameter and PDI were measured by DLS in 10 mM NaCl ± SEM (n ≥ 3).
[b]ζ-potential was measured by laser Doppler anemometry in 10 mM NaCl at pH 7.0. Mean ± SEM (n ≥ 3).

Example 4: Effect of Changes in Diameter on In Vivo Volume of Distribution

Results

Cationic polymer-based NPs have a "sticky" limitation when it comes to brain penetration, which is due to the adhesive moieties of brain ECM and other brain-related barriers. Also, NPs larger than ~120 nm cannot efficiently diffuse in ex vivo and in vivo brain tissue even after PEGylation. To this end, it was evaluated whether F127/PLGA-NPs possessing large diameters and a near neutral, yet slightly negative, surface charge can still achieve widespread distribution when combined with the CED technique.

Figure 4:
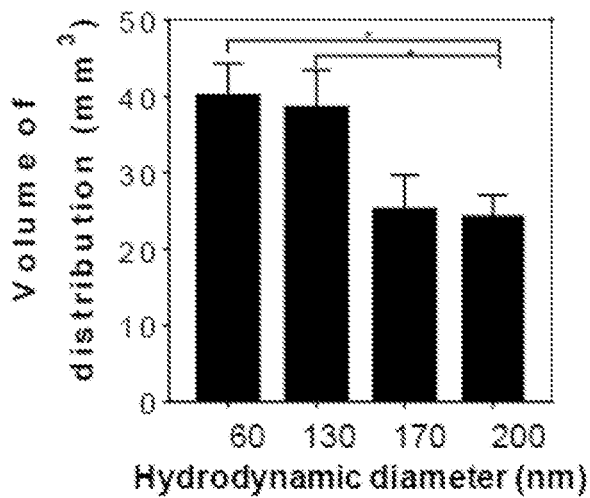
FIG. 4 is a bar graph showing volumetric distribution of F127/PLGA NPs of different hydrodynamic diameters at 60 nm, 130 nm, 170 nm, and 200 nm administered via CED in healthy rat brains. n≥4 rats. Differences are statistically significant as indicated (t-test *p<0.05)

For this study, four of the six groups were selected from Table 2, F127/PLGA-60, 130, 170, and 200 nm. FIG. 4 showed that the widespread distribution is inversely correlated with the hydrodynamic diameter. Quantitatively, there was no significant difference between the particles in the smaller range, 60 nm and 130 nm, showing 40±4 mm³ and 38±5 mm³, for the volume of distribution, respectively. Similarly, the particles in the larger range, 170 nm and 200 nm, achieved comparable distribution, showing 25±5 mm³ and 24±3 mm³, respectively. Both, 60 and 130 nm NPs demonstrated statistical significance when compared to 200 nm NPs ($p<0.05$) but not against 170 nm NPs.

Example 5: Histopathological Analysis and Safety Profile

Methods

The toxicity of F98/PLGA NPs and F127/PLGA NPs was compared to medical-grade normal saline (NS) by histology safety profile in the rats' striatum following intracranial administration via CED of Pluronic-coated PLGA NPs. Animals were sacrificed 3 days following administration and the harvested brains were fixed in 4% formaldehyde, processed, sectioned and stained with hematoxylin and eosin (H&E) by the Johns Hopkins Reference Histology Laboratory. The point of infusion was identified by the tissue cavity imparted by the needle and the region immediately adjacent was imaged and evaluated. Blind histopathological analysis was performed by a board-certified neuropathologist and tissues were scored from 0-3 for indications of inflammation and hemorrhage (0: no inflammation/hemorrhage, 1: mild, 2: moderate, 3: severe).

Results

Figure 5:
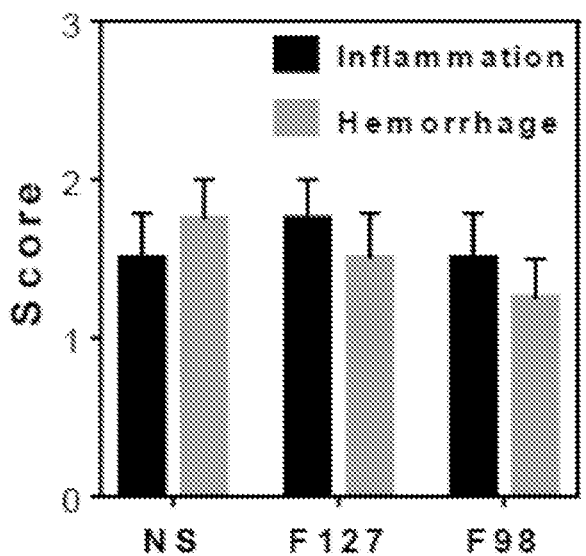
FIG. 5 is a bar graph of the histopathological analysis and safety profile, the graph showing scores of inflammation and hemorrhage 3 days following administration of medical-grade normal saline (NS), F98/PLGA NPs, and F127/PLGA NPs (0: no inflammation/hemorrhage; 1: mild; 2: moderate; 3: severe) of F98/PLGA NPs and F127/PLGA NPs following CED administration. Representative images of the injection site with hematoxylin and eosin staining in healthy brain tissue 3 days after CED at 20× (top, scale bar=500 μm) and 200× (bottom, scale bar=100 μm) magnitude. Normal saline was used as a control. Inflammation and hemorrhage were scored by a board-certified neuropathologist using a custom scale (0: no inflammation/hemorrhage, 1: mild, 2: moderate, 3: severe).

To demonstrate the safety of Pluronic-coated PLGA NPs followed by intracranial administration via CED, the toxicity of F98/PLGA NPs and F127/PLGA NPs was compared to medical-grade normal saline (NS) by histology safety profile in the rats' striatum. Following 3 days from the NPs administration, the average toxicity scores of the brain tissues for both Pluronic coatings were comparable to those of NS-treated controls (FIG. 5), with an average score of ~1.5-2 for hemorrhage and inflammation, showing that they were well-tolerated at the dose administered (15 mg/mL, 20 µL). Notably, the inflammation score increased with the respective volume of distribution in the brain (F127>F98). Importantly, regardless of the type of particle, inflammatory and hemorrhagic changes were confined around the injection site and did not propagate throughout the brain tissue. All hemorrhage and inflammation scores were negligible, ~0-1, after 30 days.

Example 6: Widespread Distribution in Orthotopic Brain Tumors

Methods
Orthotopic Tumor Inoculations

Orthotopic tumor cell inoculations were. Briefly, 100,000 cells of rat glioblastoma cells expressing mKate fluorescent protein (F98-mKate), were administered in 10 µL of DMEM over 5 minutes at a depth of 3.5 mm using a Neuros Syringe (50 µL; Hamilton, Reno, NV) mounted on an ultra-precise small-animal stereotactic frame. Rat brains were inoculated with a high numbers of tumor cells, relevant to clinical translation, to establish a model mimicking malignant gliomas characterized by rapid tumor growth rates.

Results

Figure 6A:
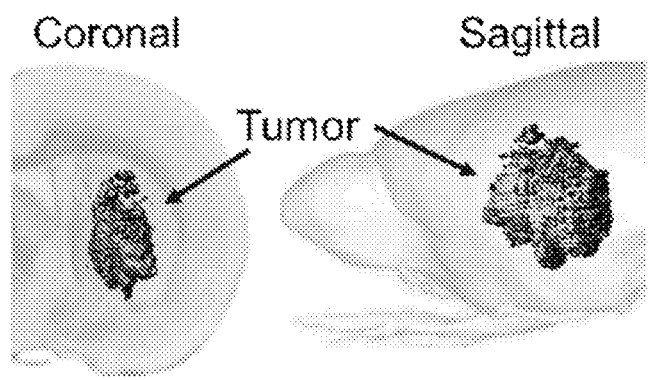
FIGS. 6A and 6B are representative 3D-rendered images depicting orthotopic F98-mKate brain tumors (dark gray) and the volumetric distribution of F127/PLGA NPs (light blue, outlined by blue-dashed lines) in the tumor bulk, obtained by stacking multiple sequential confocal images.
Figure 6B:
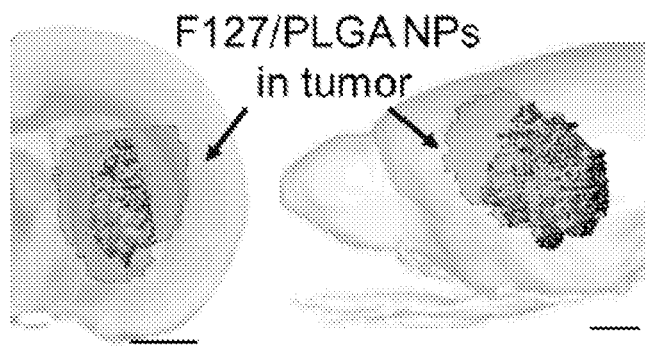

It was evaluated whether F127/PLGA-NPs can effectively diffuse and penetrate the dense cellularity within an orthotopic model of aggressive brain tumor following CED. The model was established by intracranial stereotactic inoculation of 1×10$^5$ F98 cells and a CED experiment was conducted 10 days after the inoculation when a large volume (~50 mm$^3$) of orthotopic tumor was established in the rat striatum. As shown by representative 3D-reconstructed images (FIG. 6A and FIG. 6B), F127/PLGA-NPs exhibited almost 100% tumor coverage, with widespread distribution inside and outside the tumor core (FIG. 6B). Highly invasive tumor cells that migrate beyond the tumor edge and infiltrate into normal brain tissue are responsible for recurrence of malignant gliomas. Thus, the unique ability of F127/PLGA-NPs to efficiently penetrate both normal brain parenchyma and brain tumor tissue may serve favorably for this specific application.

Example 7: Lyophilization and Cryoprotection of F127/PLGA-NPs

Methods
Lyophilization and Administration of the "Ready-to-Use" F127/PLGA NPs

For lyophilized F127/PLGA-NPs formation and evaluation, NPs were initially formed as described above at two different PLGA concentrations, 5 and 30 mg/ml. Subsequently, sucrose (OPS Diagnostics, Lebanon, NJ) was added as a cryoprotectant to a final concentration of 30 mg/mL, diluting the solution of F127/PLGA-NPs by 2-fold. Particles were then frozen in dry-ice and lyophilized overnight. Lyophilized F127/PLGA-NPs were stored at −20° C. until use and then reconstituted in sterile ultrapure water and used at the same concentration as freshly prepared F127/PLGA-NPs.

To assess the effect of osmolality of infusate solutions on the distribution of the "ready-to-use" F127/PLGA-NPs in the brain parenchyma, the osmotic pressures were adjusted by addition of NaCl to a final osmolality of 300 mOsm/kg, 370 mOsm/kg, and 480 mOsm/kg and intracranially administered via CED. The CED and imaging procedure were executed as described above.

Results

Pluronic-coated PLGA NPs are stable at room temperature in aqueous solution. They can retain their colloidal stability for weeks and even months. However, without proper care, the polymer concentration can be affected over time due to water evaporation, which could lead to "gel-like" consistency. Therefore, lyophilized NPs are more convenient for handling, as they the user simply needs to add water to adjust the desired concentration and inject. To ensure that F127/PLGA-NPs do not lose their nanoparticle characteristics after lyophilization, the physicochemical properties of two different types of F127-coated NPs, 60 nm and 130 nm, with and without sucrose as a cryoprotectant, were compared.

As Table 3 shows, particles without sucrose do not retain the original size and charge, whereas particles properly mixed with sucrose kept comparable values as the original solution.

TABLE 3

Physiochemical properties of F127/PLGA NPs after

| F127/PLGA NPs | Cryoprotectant | Z-Average ± SEM (nm)$^a$ | Number mean ± SEM (nm)$^a$ | PDI$^a$ | ζ-Potential ± SEM (mV)$^b$ |
|---|---|---|---|---|---|
| F127/PLGA-60 | N/A | 124 ± 3 | 93 ± 2 | 0.14 ± 0.03 | −3.7 ± 8.8 |
| F127/PLGA-60 | Sucrose | 93 ± 5 | 52 ± 4 | 0.17 ± 0.04 | −1.9 ± 6.9 |
| F127/PLGA-130 | N/A | 549 ± 135 | 180 ± 97 | 0.49 ± 0.12 | −4.5 ± 3.5 |
| F127/PLGA-130 | Sucrose | 170 ± 6 | 127 ± 2 | 0.10 ± 0.02 | −5.3 ± 5.1 |

Example 8: Effect of Osmolality on In Vivo Volume of Distribution

Materials and Methods

Administration of hyperosmolar saline in brain tissue results in enlargement of the ECM mesh spacings as water is drawn out of cells into intercellular space via an osmotic gradient established by the hyperosmolar saline. To verify that the osmotic modulation of the intercellular space translates in vivo, lyophilized F127/PLGA-NPs was administered via CED in saline-based infusate solutions with varying osmolality and determined their effects on the volume of distribution. Fresh particles were infused at 300 mOsm/kg (iso-osmolar, 0.9% saline) as a control, yielding 41±4 mm$^3$.

Results

Figure 7:
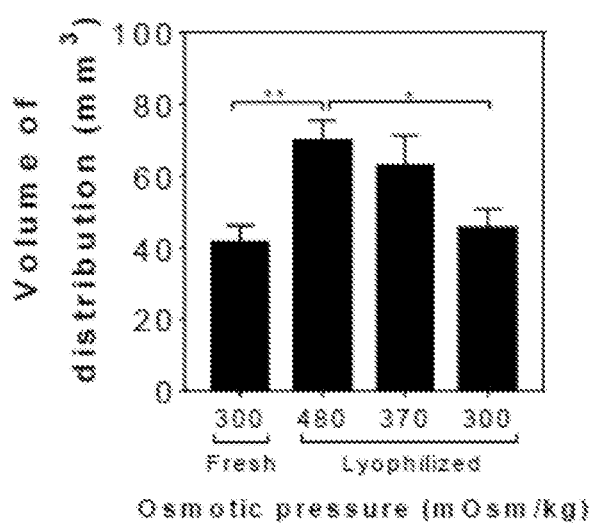
FIG. 7 is a bar graph showing volumetric distribution of F127/PLGA NPs at the infusion sites of fresh F127/PLGA NPs or lyophilized F127/PLGA NPs at various osmotic pressures, 480 mOsm/kg, 370 mOsm/kg, and 300 mOsm/kg immediately after NPs-treatment administered via CED in healthy rat brains, obtained by confocal microscopy immediately after NPs-treatment. Sale bar=1 mm. (n≥3 rats). Differences are statistically significant as indicated (*p<0.05, **p<0.01).

The volume of distribution was positively correlated with the osmolality of the infusate solution (FIG. 7). Quantitatively, NPs infused at 480 mOsm/kg (hyper-osmolar) exhibited significantly greater volume of distribution, showing 69±6 mm$^3$, compared to 370 and 300 mOsm/kg, which exhibited 63±3 mm$^3$ and 45±5 mm$^3$, respectively.

Pluronic-coating enhances NPs physicochemical properties for brain penetration, including colloidal stability and near-neutral surface charge. The size and charge can be manipulated as necessary by adjusting the starting PLGA concentration but keeping into consideration that the volumetric distribution is inversely correlated to the hydrodynamic diameter, without altering the colloidal stability. This demonstrates that the "mesh-like" pores sizes of the brain tolerate a dynamic equilibrium when slow pressure gradients occur, which allow "expansion" and "flexibility" for enough penetration when larger, but well coated, NPs are infused via CED. F127/PLGA-NPs provided the highest volume of distribution in healthy brain parenchyma, with great particle retention after 48 hours from CED. F127/PLGA-NPs can efficaciously achieve widespread distribution into a highly aggressive orthotopic brain tumor model when combined with CED. Altering the pore sizes of the rat brain ECM by using lyophilized NPs with infusate solutions of varying osmolality, improved the volumetric distribution in vivo. The combination approach of the "ready-to-use" F127/PLGA-NPs, administered in hyper-osmolar infusate solutions via CED, may be widely employed to promote widespread delivery of therapeutics throughout the brain.

The CED approach overcomes a major obstacle hindering the development of drug therapies, i.e. poor local diffusion, by allowing slower infusion rates and controlled pressure gradients in the brain parenchyma. However, the CED technique is not enough for achieving widespread distribution. Poloxamers such as F127, F98, and F68, consist of a hydrophobic polypropylene oxide (PPO) block and hydrophilic polyethylene oxide (PEO) segments, where the composition (PPO:PEO) and MW (block length) impact the properties of the surfactant. Without Pluronic coatings, PLGA NPs have exposed hydrophobic regions on the particle core and ζ-potentials more negative than −40 mV. These particles adhered to components within the brain parenchyma by electrostatic or hydrophobic interactions, limiting the diffusive nature of the particles even after CED. Although the significant differences in the surface charge of the various types of PLGA NPs do not affect the colloidal stability under physiological conditions, widespread distribution remains inversely correlated with the ζ-potentials. Since F127 has a longer PPO segment compared to F98 and F68, it allowed better shielding of any exposed hydrophobic regions. Consequently, F127 demonstrated better volumetric distribution in healthy brain tissues than F98, F68, and uncoated PLGA NPs, respectively.

The pore sizes of the brain ECM has been previously estimated to be ~38-64 nm, but it has been recently re-evaluated them using non-adhesive probes to be as large as ~110 nm. A lot of studies have combined the CED approach with nanocarriers possessing ~100-150 nm in size to treat brain tumors. Very few studies have used the CED technique to infuse nanocarriers with larger diameters, probably due to the known size-constraint in the ECM. As an example, MacKay J. A. et al. reported that ~200 nm liposomes penetrated less than 80 nm liposomes even when shielded with PEG. Similarly, Zhan W. et al. reported that liposomes with 100 nm and 135 nm in diameter have comparable diffusivity in tumor tissue, whereas the value reduces by one order of magnitude when diameter reaches 500 nm. This is consistent with what was observed when infusing F127/PLGA-NPs with diameters larger than ~160 nm, which experienced a reduction in the volumetric distribution by ~2-fold after CED. Based on these results, it was determined that non-adhesive NPs, smaller than ~150 nm, are preferable for maximum brain tissue penetration, particularly for brain tumor applications.

The unique pathological hallmarks of brain tumors, particularly malignant gliomas, present significant challenges for CED. First, brain tumors are often characterized by the presence of necrotic regions, hemorrhage and fibrin clots, making them naturally heterogeneous structures. Second, the increased vascular permeability in tumors and surrounding regions can cause rapid clearance of infused drugs. Additionally, the high pressure within brain tumors can lead to reflux or backflow of the infusate up through the catheter. These features have shown to affect distribution of polymer-based NPs after CED. Therefore, nanoparticle distribution depends on the size and properties of the tumor and appears to be heterogeneous and asymmetric. Saucier-Sawyer J. K. et al. showed how significant quantities of PLGA NPs tend to accumulate in the peritumoral space, such that most of the tumor is surrounded by particles which are distributed along the tumor margins. In these studies, images from F127/PLGA-NPs infused into large F98 tumors showed consistent coverage of the tumor, where the margins of these larger tumors are surrounded by the "excess" of particles that diffused further away from the tumor core due to the "human-error" of the CED execution. These findings suggest that tumor size and NPs characteristics are important criteria that should be considered when determining infusion site and parameters for CED.

The steric obstruction imposed by the ECM structure remains a challenging limitation to non-adhesive NPs for achieving widespread distribution in the brain, particularly when relatively large NPs are required. To overcome this hurdle, Nicholson et al. and Zhang C. et al. have demonstrated that exposure of brain tissues to modestly hyperosmolar solutions (500 mOsmol/kg) increases the volume of the intercellular space, which minimizes the tissue's resistance to NP diffusion. In agreement with these studies, it was demonstrated that the osmotic modulation of the "ready-to-use" F127/PLGA-NPs resulted in enhanced volume of distribution, by enlargement of the ECM mesh spacings as water is drawn out of cells into intercellular space via an osmotic gradient established by the hyperosmolar saline.

In this study, it has been demonstrated that the use of Pluronic coatings improves the ability of the most-widely used biodegradable PLGA nanoparticle platform to penetrate within the brain parenchyma. This led to the discovery of a new brain-penetrating nanoparticle formulation, F127/

PLGA-NPs, for future drug studies in brain tumors. A simple and safe method to maximize the distribution of therapeutic F127/PLGA-NPs in the brain combines the CED approach in a hyperosmolar infusate solution, that could address major drawbacks currently associated with CED applications in clinical trials, including limited ECM distribution and perivascular sequestration.

Prior studies have demonstrated that administration of hyperosmolar saline in brain tissue results in enlargement of the ECM mesh spacings as water is drawn out of cells into intercellular space via an osmotic gradient established by the hyperosmolar saline. To verify that the osmotic modulation of the intercellular space translates in vivo, lyophilized F127/PLGA-NPs via CED in saline-based infusate solutions with varying osmolality and determined their effects on the volume of distribution. Fresh particles were infused at 300 mOsm/kg (iso-osmolar, 0.9% saline) as a control, yielding 41±4 mm$^3$. The volume of distribution was positively correlated with the osmolality of the infusate solution (FIG. 7). Quantitatively, NPs infused at 480 mOsm/kg (hyper-osmolar) exhibited significantly greater volume of distribution, showing 69±6 mm$^3$, compared to 370 and 300 mOsm/kg, which exhibited 63±3 mm$^3$ and 45±5 mm$^3$, respectively.

SUMMARY OF RESULTS AND CONCLUSIONS

Pluronic-coating enhances NPs physicochemical properties for brain penetration, including colloidal stability and near-neutral surface charge. The size and charge can be manipulated as necessary by adjusting the starting PLGA concentration but keeping into consideration that the volumetric distribution is inversely correlated to the hydrodynamic diameter, without altering the colloidal stability. This demonstrates that the "mesh-like" pores sizes of the brain tolerate for a dynamic equilibrium when slow pressure gradients occur, which allow "expansion" and "flexibility" for enough penetration when larger, but well coated, NPs are infused via CED. F127/PLGA-NPs provided the highest volume of distribution in healthy brain parenchyma, with great particle retention after 48 hours from CED. F127/PLGA-NPs can efficaciously achieve widespread distribution into a highly aggressive orthotopic brain tumor model when combined with CED. Alteration of the pore sizes of the rat brain ECM by using lyophilized NPs with infusate solutions of varying osmolality, improved the volumetric distribution in vivo. The combination approach of the "ready-to-use" F127/PLGA-NPs, administered in hyperosmolar infusate solutions via CED, may be widely employed to promote widespread delivery of therapeutics throughout the brain.

The CED approach overcomes a major obstacle hindering the development of drug therapies, i.e. poor local diffusion, by allowing slower infusion rates and controlled pressure gradients in the brain parenchyma. Alone, the CED technique is not enough for achieving widespread distribution. Poloxamers such as F127, F98, and F68, consist of a hydrophobic polypropylene oxide (PPO) block and hydrophilic polyethylene oxide (PEO) segments, where the composition (PPO:PEO) and MW (block length) impact the properties of the surfactant. Without Pluronic coatings, PLGA NPs have exposed hydrophobic regions on the particle core and ζ-potentials more negative than −40 mV. These particles adhere to components within the brain parenchyma by electrostatic or hydrophobic interactions, limiting the diffusive nature of the particles even after CED. Although the significant differences in the surface charge of the various types of PLGA NPs do not affect the colloidal stability under physiological conditions, widespread distribution remains inversely correlated with the ζ-potentials. Since F127 has a longer PPO segment compared to F98 and F68, it allowed better shielding of any exposed hydrophobic regions. Consequently, F127 demonstrated better volumetric distribution in healthy brain tissues than F98, F68, and uncoated PLGA NPs, respectively.

The pore sizes of the brain ECM has been previously estimated to be ~38-64 nm, but have now been shown using non-adhesive probes to be as large as ~110 nm. Infusing F127/PLGA-NPs with diameters larger than ~160 nm showed they experienced a reduction in the volumetric distribution by ~2-fold after CED. Based on these results, it was determined that non-adhesive NPs, smaller than ~150 nm, are preferable for maximum brain tissue penetration, particularly for brain tumor applications.

The unique pathological hallmarks of brain tumors, particularly malignant gliomas, present significant challenges for CED. First, brain tumors are often characterized by the presence of necrotic regions, hemorrhage and fibrin clots, making them naturally heterogeneous structures. Second, the increased vascular permeability in tumors and surrounding regions can cause rapid clearance of infused drugs. Additionally, the high pressure within brain tumors can lead to reflux or backflow of the infusate up through the catheter. These features have shown to affect distribution of polymer-based NPs after CED. Therefore, nanoparticle distribution depends on the size and properties of the tumor and appears to be heterogeneous and asymmetric. Significant quantities of PLGA NPs tend to accumulate in the peritumoral space, such that most of the tumor is surrounded by particles which are distributed along the tumor margins. In contrast, images from F127/PLGA-NPs infused into large F98 tumors showed consistent coverage of the tumor, where the margins of these larger tumors are surrounded by the "excess" of particles that diffused further away from the tumor core due to the "human-error" of the CED execution. These findings show that tumor size and NPs characteristics are important criteria that should be considered when determining infusion site and parameters for CED.

We claim:

1. A dosage formulation for delivery of a therapeutic, prophylactic, or diagnostic agent to the brain consisting of
    a. nanoparticles having a diameter between 60 and 230 nm densely coated with a triblock copolymer of poloxamer 407, poloxamer 288, or a combination thereof, and the nanoparticles have a surface zeta potential between −10 mV and 5 mV,
    b. an effective amount of a therapeutic, prophylactic or diagnostic agent encapsulated in or on the nanoparticles,
    c. a cryoprotectant, and
    d. a pharmaceutically acceptable excipient for delivery into the brain, and
    wherein the nanoparticles have a polymeric core made of one or more biodegradable hydrophobic polymers.

2. The formulation of claim 1, wherein the one or more hydrophobic polymers are selected from the group consisting of poly(lactic acid-co-glycolic acid) (PLGA), poly(lactic acid) (PLA), and poly(glycolic acid) (PGA), and blends thereof.

3. The formulation of claim 1, wherein the nanoparticles are formulated for direct injection into the brain via convection enhanced delivery.

4. The formulation of claim 1, wherein the nanoparticles have an average diameter between 110 nm and 230 nm.

5. The formulation of claim 1, having a percent drug loading of the therapeutic, prophylactic, or diagnostic agent relative to the total particle, agent and coating weight from about 1% to about 80% by weight.

6. The formulation of claim 1, wherein the nanoparticle releases an effective amount of the therapeutic, prophylactic, or diagnostic agent over a period of at least 10 minutes.

7. The formulation of claim 1, wherein the nanoparticles are formulated with an osmolality between about 300 mOsm/kg and about 1000 mOsm/kg, effective to increase volumetric distribution of the nanoparticles at a site of administration in the brain relative to an equivalent formulation with an osmolality of less than 300 mOsm/kg.

8. A brain-penetrating nanoparticle comprising
   a. a biodegradable hydrophobic core,
   b. a surface altering agent surrounding the hydrophobic core, and
   c. a therapeutic, prophylactic, or diagnostic agent,
   wherein the therapeutic, prophylactic, or diagnostic agent is associated with the hydrophobic core,
   wherein the nanoparticle has a diameter between 150 and 250 nm,
   a surface zeta potential between −10 mV and 5 mV, and
   wherein the surface altering agent comprises a triblock copolymer of poloxamer 407, poloxamer 288, or a combination thereof.

9. A formulation comprising the brain-penetrating nanoparticle of claim 8, and a pharmaceutically acceptable excipient wherein the formulation has an osmolality between about 300 mOsm/kg and about 1000 mOsm/kg.

10. A method for delivering a therapeutic, prophylactic, or diagnostic agent to the brain, the method comprising administering the formulation of claim 1 to a subject.

11. The method of claim 10, wherein the formulation is administered directly to the brain.

12. The method of claim 10, wherein the formulation is administered systemically in combination with mechanical disruption comprising ultrasound and the nanoparticles reach the brain by passing through the blood-brain barrier.

13. The method of claim 11, wherein the formulation is administered in combination with one or more techniques to facilitate passage of the particles through the blood brain barrier.

14. The method of claim 13, wherein the technique is selected from the group consisting of electron paramagnetic resonance, ultrasound, and ultrasound plus microbubbles.

15. The method of claim 10, wherein the subject has a disease or disorder selected from the group consisting of tumors, neurological disorders, and brain injury or trauma.

* * * * *

UNITED STATES PATENT AND TRADEMARK OFFICE
CERTIFICATE OF CORRECTION

PATENT NO. : 12,496,279 B2
APPLICATION NO. : 17/602664
DATED : December 16, 2025
INVENTOR(S) : Jung Soo Suk, Karina Negron and Justin Hanes Page 1 of 1

It is certified that error appears in the above-identified patent and that said Letters Patent is hereby corrected as shown below:

In the Claims

Column 28, Claim 1, Line 49, replace "between- 10 mV and 5 mV" with "between -10 mV and 5 mV".

Signed and Sealed this
Twentieth Day of January, 2026

John A. Squires
*Director of the United States Patent and Trademark Office*